US012695260B2

(12) United States Patent
(10) Patent No.: US 12,695,260 B2
(45) Date of Patent: Jul. 28, 2026

Krompegel et al.

(54) AUTOMATED WIRE KITTING SYSTEMS

(71) Applicant: Aptiv Manufacturing Management Services GmbH, Schaffhausen (CH)

(72) Inventors: Sean Krompegel, Canfield, OH (US); David A. Myers, Hubbard, OH (US); Jeffrey M. Handel, Canfield, OH (US); Keith B. Adkins, Warren, OH (US)

(73) Assignee: Aptiv Manufacturing Management Services GmbH, Schaffhausen (CH)

( * ) Notice: Subject to any disclaimer, the term of this patent is extended or adjusted under 35 U.S.C. 154(b) by 791 days.

(21) Appl. No.: 17/911,738

(22) PCT Filed: Mar. 15, 2021

(86) PCT No.: PCT/IB2021/052124

§ 371 (c)(1), (2) Date: Sep. 15, 2022

(87) PCT Pub. No.: WO2022/058993

PCT Pub. Date: Mar. 24, 2022

(65) Prior Publication Data

US 2023/0130455 A1 Apr. 27, 2023

Related U.S. Application Data

(60) Provisional application No. 63/081,104, filed on Sep. 21, 2020, provisional application No. 62/990,190, filed on Mar. 16, 2020.

(51) Int. Cl.
*H01R 43/055* (2006.01)
*H01R 43/048* (2006.01)
(Continued)

(52) U.S. Cl.
CPC ....... *H01R 43/055* (2013.01); *H01R 43/0486* (2013.01); *H01R 43/05* (2013.01);
(Continued)

(58) Field of Classification Search
CPC .. H01R 43/055; H01R 43/0486; H01R 43/05; H01R 43/052; H01R 43/20; Y10T 29/53235
See application file for complete search history.

(56) References Cited

U.S. PATENT DOCUMENTS

2015/0372437 A1 12/2015 Morris et al.
2019/0006809 A1 * 1/2019 Takada ................ H01R 43/055

FOREIGN PATENT DOCUMENTS

CN 107359493 A 11/2017
CN 109586133 A 4/2019
(Continued)

OTHER PUBLICATIONS

Ogihara et al, "Mechanical Analysis of the Crimping Connection", Electrical Contacts—2006. Proceedings of the 52nd IEEE Holm Conference on Electrical Contacts, Montreal, QC, Canada, 2006, pp. 89-94. (Year: 2006).*
(Continued)

*Primary Examiner* — A. Dexter Tugbang
(74) *Attorney, Agent, or Firm* — Miller Johnson

(57) ABSTRACT

An automated wire kitting system for assembling wire leads for a wired connector comprises a terminal delivery system configured to obtain a target terminal from a plurality of different types of terminals for wire leads and a crimp press comprising a plurality of dies and being configured to obtain a wire having an exposed portion where the wire's insulation has been removed, receive the target terminal from the terminal delivery system, engage a target die of the plurality of dies corresponding to a type of the target terminal, and crimp the target terminal onto the exposed portion of the wire using the target die of the plurality of dies to assemble a wire lead.

6 Claims, 26 Drawing Sheets

(51) Int. Cl.
*H01R 43/05* (2006.01)
*H01R 43/052* (2006.01)
*H01R 43/20* (2006.01)

(52) U.S. Cl.
CPC .......... *H01R 43/052* (2013.01); *H01R 43/20* (2013.01); *Y10T 29/53235* (2015.01)

(56) References Cited

FOREIGN PATENT DOCUMENTS

| | | | | |
|---|---|---|---|---|
| CN | 210120312 | U | | 2/2020 |
| EP | 0701307 | A1 | | 3/1996 |
| EP | 0711010 | B1 | | 7/2000 |
| GB | 1446102 | A | | 8/1976 |
| JP | 2014235809 | A | | 12/2014 |
| JP | 2017188432 | A | * | 10/2017 |
| KR | 20180017495 | A | | 2/2018 |

OTHER PUBLICATIONS

Chinese Office Action received for CN202180034172.9 dated Jul. 16, 2025, 24 pages.
Communication received for EP21713140.8 dated Mar. 5, 2026, 8 pages.

* cited by examiner

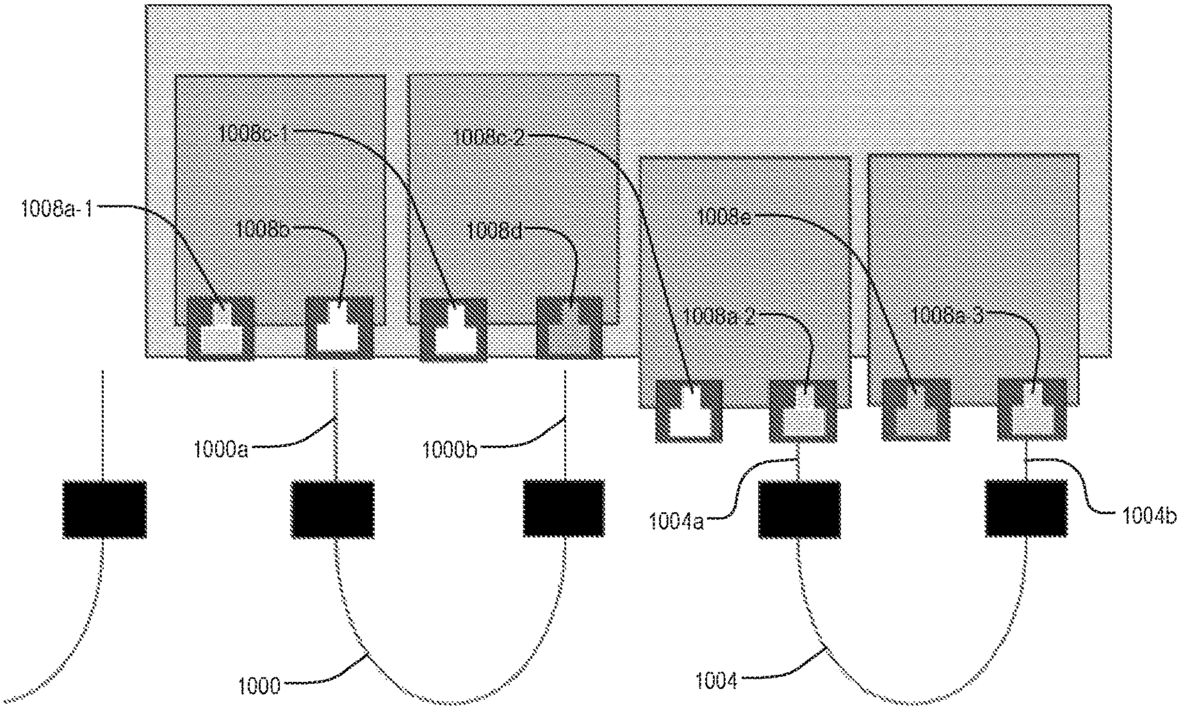
FIG. 10C
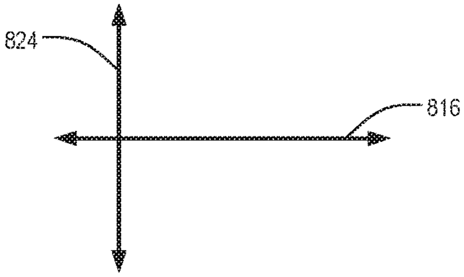

AUTOMATED WIRE KITTING SYSTEMS

CROSS-REFERENCE TO RELATED APPLICATION(S)

The present application is a United States national stage entry from PCT Application No. PCT/IB2021/052124, filed on Mar. 15, 2021, which claims the benefit of U.S. Provisional Application No. 62/990,190, filed on Mar. 16, 2020, and U.S. Provisional Application No. 63/081,104, filed on Sep. 21, 2020. The disclosures of the above-identified applications are incorporated herein by reference in their entirety.

FIELD

The present disclosure generally relates to wire kitting and, more particularly, to automated wire kitting systems and methods.

BACKGROUND

Wire or cable kitting is the process of obtaining a wire, stripping away a portion of the wire's insulation, and crimping a terminal onto the exposed portion of the wire to form a wire lead. A wired connector or wire harness typically comprises a plurality of wire leads having their terminals inserted into and secured within respective terminal portions of a connector. During assembly of wired connectors, a human or robotic assembler typically follows a set of instructions (a wire diagram, computer-executable instructions, etc.) whereby a container or bin of wire leads is searched through to identify a target wire lead, which is then installed by the assembler into a respective target terminal portion of a connector. This process can be costly and time consuming. Accordingly, while these conventional wire kitting systems and methods work well for their intended purpose, an opportunity exists for improvement in the relevant art.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to one aspect of the present disclosure, an automated wire kitting system for assembling wire leads for a wired connector is presented. In one exemplary implementation, the automated wire kitting system comprises: a plurality of terminal containers each storing a different type of terminals for wire leads, a first transport system configured to collect a target terminal from a target terminal container of the plurality of terminal containers, and a second transport system configured to receive the target terminal from the first transport system and to deliver the target terminal to a crimp press, wherein the crimp press is configured to crimp the target terminal onto an exposed portion of a wire to assemble a wire lead.

In some implementations, the first transport system comprises a first gripping device having first opposing gripping members configured to grip and control movement of the target terminal. In some implementations, the first gripping device or a separate sensor system is configured to identify opposing target gripping points on the target terminal and movably close the first opposing gripping members on the opposing target gripping points on the target terminal to control movement of the target terminal from the target terminal container. In some implementations, the automated wire kitting system further comprises a cutting system configured to cut the different types of terminals stored in the plurality of terminal containers from respective carrier strips.

In some implementations, the first gripping device is further configured to translate along a first axis parallel to the plurality of terminal containers to control movement of the target terminal from the target terminal container, and translate along a second axis perpendicular to the first axis to deliver and transfer the target terminal to the second transport system. In some implementations, the second transport system comprises a second gripping device having second opposing gripping members configured to grip and control movement of the target terminal from the first gripping device. In some implementations, the second gripping device is arranged approximately 180 degrees relative to the first gripping device.

In some implementations, the second gripping device is further configured to translate along the second axis to control movement of the target terminal from the first gripping device, and translate along at least the second axis to deliver the target terminal to the crimp press. In some implementations, the second gripping device is configured to control movement of the target terminal from the first gripping device at a first position behind the crimp press, translate along at least the second axis to a second position in front of the crimp press.

According to another aspect of the present disclosure, an automated wire kitting method for assembling wired leads for a wired connector is presented. In one exemplary implementation, the automated wire kitting method comprises: storing a different type of terminals for wire leads in each of a plurality of terminal containers, obtaining, by a first transport system, movable control of a target terminal from a target terminal container of the plurality of terminal containers, delivering, by the first transport system, the target terminal to a second transport system, obtaining, by the second transport system, movable control of the target terminal from the first transport system, and delivering, by the second transport system, the target terminal to a crimp press, wherein the crimp press is configured to crimp the target terminal onto an exposed portion of a wire to assemble a wire lead.

In some implementations, the first transport system comprises a first gripping device having first opposing gripping members configured to grip and control movement of the target terminal. In some implementations, the automated wire kitting method further comprises identifying, by the first gripping device or a separate sensor system, opposing target gripping points on the target terminal, and movably closing, by the first gripping device, the first opposing gripping members on the opposing target gripping points on the target terminal control movement of the target terminal from the target terminal container. In some implementations, the automated wire kitting method further comprises cutting, by a cutting system, the different types of terminals stored in the plurality of terminal containers from respective carrier strips.

In some implementations, the automated wire kitting method further comprises translating, by the first gripping device, along a first axis parallel to the plurality of terminal containers to control movement of the target terminal from the target terminal container, and translating, by the first gripping device, along a second axis perpendicular to the first axis to deliver and transfer the target terminal to the second transport system. In some implementations, the second transport system comprises a second gripping device having second opposing gripping members configured to grip and control movement of the target terminal from the first gripping device. In some implementations, the second gripping device is arranged approximately 180 degrees relative to the first gripping device.

In some implementations, the automated wire kitting method further comprises translating, by the second gripping device, along the second axis to obtain movable control of the target terminal from the first gripping device, and translating, by the second gripping device, along at least the second axis to deliver the target terminal to the crimp press. In some implementations, the automated wire kitting method further comprises obtaining, by the second gripping device, movable control of the target terminal from the first gripping device at a first position behind the crimp press, translating, by the second gripping device, along at least the second axis to a second position in front of the crimp press.

According to another aspect of the present disclosure, an automated wire kitting means for assembling wire leads for a wired connector is presented. In one exemplary implementation, the automated wire kitting system means comprises: a storage means for storing a plurality of different types of terminals for wire leads, and a transport means for controlling movement of a target terminal from the storage means and delivering the target terminal to a crimping means, wherein the crimping means is a means for crimping the target terminal onto an exposed portion of a wire to assemble a wire lead.

In some implementations, the transport means comprises a first transport means for gripping and controlling movement of the target terminal from the storage means, and a second transport means for gripping and controlling movement of the target terminal upon delivery from the first transport means and delivering the target terminal to the crimping means.

According to another aspect of the present disclosure, an automated wire kitting system for assembling wire leads for a wired connector is presented. In one exemplary implementation, the automated wire kitting system comprises: a terminal delivery system configured to obtain a target terminal from a plurality of different types of terminals for wire leads, and a crimp press comprising a plurality of dies, the crimp press being configured to obtain a wire having an exposed portion where the wire's insulation has been removed, receive the target terminal from the terminal delivery system, engage a target die of the plurality of dies corresponding to a type of the target terminal, and crimp the target terminal onto the exposed portion of the wire using the target die of the plurality of dies to assemble a wire lead.

In some implementation, the plurality of dies are arranged in a shuttle system that is translatable along a first axis to position the target die for engagement. In some implementations, the crimp press comprises eight dies. In some implementations, the shuttle system further comprises securing mechanisms to retain a remainder of the plurality of dies that are not engaged. In some implementations, each of the plurality of dies is also vertically movable along a second axis perpendicular to the first axis in order to engage and disengage the target die. In some implementations, the crimp press further comprises a wedge mechanism configured to be (i) temporarily inserted beneath a bottom portion of the target die when engaged to increase a rigidity of the target die during crimping and (ii) removed from beneath the bottom portion of the target die when disengaging the target die.

In some implementations, the engaged target die receives the target terminal in first and second portions that are initially vertically spaced apart, wherein the automated wire kitting system further comprises a wire delivery system configured to deliver the wire to a front portion of the crimp press such that the exposed portion of the wire is aligned between the first and second portions of the target terminal, and in response to delivering the wire, push the wire downward such that the exposed portion of the wire engages or is proximate to the second portion of the target terminal, wherein the crimp press then crimps the target terminal onto the exposed portion of the wire using the engaged target die by pressing the first portion of the target terminal downward onto the exposed portion of the wire and the second portion of the target terminal to obtain the wire lead. In some implementations, the crimp press further comprises a single load sensor configured to be engageable with each of the plurality of dies, wherein the single load sensor, when engaged with the target die, is configured to measure crimping force as part of a crimp force monitoring (CFM) process.

In some implementations, the terminal delivery system comprises first and second transport systems arranged behind the crimp press, the first transport system is configured to (i) control movement of the target terminal from a target terminal container of a plurality of terminal containers storing the plurality of different types of terminals and (ii) deliver the target terminal to the second transport system, and the second transport system is configured to (i) control movement of the target terminal from the first transport system and (ii) deliver the target terminal to a front portion of the crimp press.

According to another aspect of the present disclosure, an automated wire kitting method for assembling wire leads for a wired connector is presented. In one exemplary implementation, the automated wire kitting method comprises: obtaining, by a terminal delivery system, a target terminal from a plurality of different types of terminals for wire leads, obtaining, by a crimp press comprising a plurality of dies, a wire having an exposed portion where the wire's insulation has been removed, receiving, by the crimp press, the target terminal from the terminal delivery system, engaging, by the crimp press, a target die of the plurality of dies corresponding to a type of the target terminal, and crimping, by the crimp press, the target terminal onto the exposed portion of the wire using the target die of the plurality of dies to assemble a wire lead.

In some implementations, the plurality of dies are arranged in a shuttle system that is translatable along a first axis to position the target die for engagement. In some implementations, the crimp press comprises eight dies. In some implementations, the shuttle system further comprises securing mechanisms to retain a remainder of the plurality of dies that are not engaged. In some implementations, each of the plurality of dies is also vertically movable along a second axis perpendicular to the first axis in order to engage and disengage the target die. In some implementations, the automated wire kitting method further comprises temporarily inserting, by the crimp press, a wedge mechanism beneath a bottom portion of the target die when engaged to increase a rigidity of the target die during crimping, and removing, by the crimp press, the wedge mechanism from beneath the bottom portion of the target die when disengaging the target die.

In some implementations, the engaged target die receives the target terminal in first and second portions that are initially vertically spaced apart, and the method further comprises delivering, by a wire delivery system, the wire to a front portion of the crimp press such that the exposed portion of the wire is aligned between the first and second portions of the target terminal, and in response to delivering the wire, pushing, by the wire delivery system, the wire downward such that the exposed portion of the wire engages or is proximate to the second portion of the target terminal, wherein the crimp press then crimps the target terminal onto the exposed portion of the wire using the engaged target die by pressing the first portion of the target terminal downward onto the exposed portion of the wire and the second portion of the target terminal to obtain the wire lead. In some implementations, the automated wire kitting method further comprises measuring, by a single load sensor of the crimp press that is engaged with the target die, crimping force as part of a CFM process, wherein the single load sensor is configured to be engageable with each of the plurality of dies.

In some implementations, the terminal delivery system comprises first and second transport systems arranged behind the crimp press, and the method further comprises obtaining, by the first transport system, movable control of the target terminal from a target terminal container of a plurality of terminal containers storing the plurality of different types of terminals, delivering, by the first transport system, the target terminal to the second transport system, obtaining, by the second transport system, movable control of the target terminal from the first transport system, and delivering, by the second transport system, the target terminal to a front portion of the crimp press.

According to another aspect of the present disclosure, an automated wire kitting means for assembling wire leads for a wired connector is presented. In one exemplary implementation, the automated wire kitting means comprises: a terminal delivery means for obtaining a target terminal from a plurality of different types of terminals for wire leads, and a crimp press means comprising a plurality of dies, the crimp press means being for obtaining a wire having an exposed portion where the wire's insulation has been removed, receiving the target terminal from the terminal delivery system, engaging a target die of the plurality of dies corresponding to a type of the target terminal, and crimping the target terminal onto the exposed portion of the wire using the target die of the plurality of dies to assemble a wire lead.

In some implementations, the plurality of dies are arranged in a shuttle means for transport along a first axis to position the target die for engagement. In some implementations, According to another aspect of the present disclosure, an automated wire kitting system for assembling wire leads for a wired connector is presented. In one exemplary implementation, the automated wire kitting system comprises: a wire lead assembly system configured to assemble a plurality of wire leads each having a wire with an exposed portion where the wire's insulation has been stripped away and a terminal crimped onto the exposed portion, and a wire lead singulation system comprising a base member, and a plurality of independent singulation devices attached to or defined by the base member, wherein each singulation device of the plurality of independent singulation devices is configured to receive and temporarily secure one of the plurality of wire leads, wherein the wire lead assembly system is further configured to insert and temporarily secure the plurality of wire leads in the plurality of independent singulation devices of the wire lead singulation system.

In some implementations, the plurality of independent singulation devices are spring-loaded metal grip fingers. In some implementations, the plurality of independent singulation devices are injection molded plastic grip fingers. In some implementations, the wire lead assembly system is configured to insert and temporarily secure the plurality of wire leads in the plurality of independent singulation devices according to a predefined order or pattern. In some implementations, the predefined order or pattern corresponds to a specific installation order or pattern that the plurality of wire leads will be inserted into respective terminal portions of the wired connector during assembly thereof.

In some implementations, delivery of the wire lead singulation system to a wired connector assembly station causes an assembler to insert the plurality of wire leads into the respective terminal portions of the wired connector to assembly the wired connector. In some implementations, the assembler is a robotic assembler having a set of installation instructions corresponding to the specific installation order or pattern. In some implementations, the assembler is a human assembler. In some implementations, the specific installation order or pattern is left-to-right or right-to-left.

According to another aspect of the present disclosure, an automated wire kitting method for assembling wire leads for a wired connector is presented. In one exemplary implementation, the automated wire kitting method comprises: assembling, by a wire lead assembly system, a plurality of wire leads each having a wire with an exposed portion where the wire's insulation has been stripped away and a terminal crimped onto the exposed portion, and inserting and temporarily securing, by the wire lead assembly system, the plurality of wire leads in a plurality of independent singulation devices of a wire lead singulation system, respectively, wherein the wire lead singulation system comprises a base member and the plurality of independent singulation devices attached to or defined by the base member, wherein each singulation device of the plurality of independent singulation devices is configured to receive and temporarily secure one of the plurality of wire leads.

In some implementations, the plurality of independent singulation devices are spring-loaded metal grip fingers. In some implementations, the plurality of independent singulation devices are injection molded plastic grip fingers. In some implementations, the inserting and temporarily securing, by the wire lead assembly system, of the plurality of wire leads in the plurality of independent singulation devices is performed according to a predefined order or pattern. In some implementations, the predefined order or pattern corresponds to a specific installation order or pattern that the plurality of wire leads will be inserted into respective terminal portions of the wired connector during assembly thereof.

In some implementations, the automated wire kitting method further comprises delivering the wire lead singulation system to a wired connector assembly station, wherein receipt of the wire lead singulation system causes an assembler to insert the plurality of wire leads into the respective terminal portions of the wired connector to assembly the wired connector. In some implementations, the assembler is a robotic assembler having a set of installation instructions corresponding to the specific installation order or pattern. In some implementations, the assembler is a human assembler. In some implementations, the specific installation order or pattern is left-to-right or right-to-left.

According to another aspect of the present disclosure, an automated wire kitting means for assembling wire leads for a wired connector is presented. In one exemplary implementation, the automated wire kitting means comprises: a wire lead assembly means for assembling a plurality of wire leads each having a wire with an exposed portion where the wire's insulation has been stripped away and a terminal crimped onto the exposed portion, and a wire lead singulation means comprising a base member means, and a plurality of independent singulation means attached to or defined by the base member means, wherein each singulation means of the plurality of independent singulation means is for receiving and temporarily securing one of the plurality of wire leads, wherein the wire lead assembly means is also for inserting and temporarily securing the plurality of wire leads in the plurality of independent singulation means of the wire lead singulation means.

In some implementations, the plurality of independent singulation means are grip finger means.

According to another aspect of the present disclosure, an automated wire kitting system for assembling wire leads for a wired connector is presented. In one exemplary implementation, the automated wire kitting system comprises: a wire stripping system configured to remove at least a portion of an insulation of a wire to provide an exposed portion of the wire and a seal applicator system comprising a seal applicator assembly configured to translate along a first axis parallel to an assembly direction of the automated wire kitting system to install a target seal proximate to the exposed portion of the wire to obtain a sealed wire, and a seal singulation assembly configured to obtain the target seal from at least one seal hopper each storing a particular type of seals and downwardly feed the target seal along a second axis substantially perpendicular to the first axis to the seal applicator assembly.

In some implementations, the seal applicator assembly comprises a chuck configured to receive the target seal and is further configured to translate along a third axis substantially perpendicular to the first and second axes while installing the target seal. In some implementations, the seal singulation system is configured to obtain the target seal from the at least one seal hopper via a vacuum fed tube.

In some implementations, the at least one seal hopper comprises a plurality of seal hoppers storing at least two different types of seals. In some implementations, the seal applicator assembly comprises 8 seal applicator devices that are collectively translatable along the first axis and the third axis and wherein the seal singulation assembly comprises 8 seal singulation devices that are each translatable along the second axis.

In some implementations, the wire stripping system is configured to remove two opposing end portions of the insulation of the wire to provide first and second exposed end portions of the wire, and the seal applicator assembly is configured to translate along the first axis to install first and second target seals proximate to the first and second exposed end portions of the wire, respectively, to obtain the sealed wire. In some implementations, the seal applicator system is further configured to provide the sealed wire to a crimp press configured to crimp a target terminal onto the exposed portion of the sealed wire to assemble a wire lead.

According to another aspect of the present disclosure, an automated wire kitting method for assembling wire leads for a wired connector is presented. In one exemplary implementation, the automated wire kitting method comprises: removing at least a portion of an insulation of a wire to provide an exposed portion of the wire, translating, by a seal applicator assembly of a seal applicator system, along a first axis parallel to an assembly direction of the automated wire kitting system, installing, by the seal applicator assembly, a target seal proximate to the exposed portion of the wire to obtain a sealed wire, obtaining, by a seal singulation assembly of the seal applicator system, the target seal from at least one seal hopper each storing a particular type of seals, and downwardly feeding, by the seal singulation assembly, the target seal along a second axis substantially perpendicular to the first axis to the seal applicator assembly.

In some implementations, the seal applicator assembly comprises a chuck configured to receive the target seal, and wherein the method further comprises translating, by the chuck, along a third axis substantially perpendicular to the first and second axes while installing the target seal. In some implementations, the method further comprises obtaining, by the seal singulation assembly, the target seal from the at least one seal hopper via a vacuum fed tube.

In some implementations, the at least one seal hopper comprises a plurality of seal hoppers storing at least two different types of seals. In some implementations, the seal applicator assembly comprises 8 seal applicator devices that are collectively translatable along the first axis and the third axis and wherein the seal singulation assembly comprises 8 seal singulation devices that are each translatable along the second axis.

In some implementations, removing at least a portion of the insulation of the wire comprises removing two opposing end portions of the insulation of the wire to provide first and second exposed end portions of the wire, and translating, by the seal applicator assembly, along the first axis comprises translating along the first axis to install first and second target seals proximate to the first and second exposed end portions of the wire, respectively, to obtain the sealed wire. In some implementations, the method further comprises providing, by the seal applicator system, the sealed wire to a crimp press configured to crimp a target terminal onto the exposed portion of the sealed wire to assemble a wire lead.

According to yet another aspect of the present disclosure, an automated wire kitting means for assembling wire leads for a wired connector is presented. In one exemplary implementation, the automated wire kitting system means comprises: wire stripping means for removing at least a portion of an insulation of a wire to provide an exposed portion of the wire, seal applicator means for translating along a first axis parallel to an assembly direction of the automated wire kitting system to install a target seal proximate to the exposed portion of the wire to obtain a sealed wire, and seal singulation means for obtaining the target seal from at least one seal hopper means each storing a particular type of seals and for downwardly feeding the target seal along a second axis substantially perpendicular to the first axis to the seal applicator means.

In some implementations, the seal applicator means comprises a chuck means for receiving the target seal and for translating along a third axis substantially perpendicular to the first and second axes while installing the target seal. In some implementations, the seal singulation means obtains the target seal from the at least one seal hopper via a vacuum fed tube.

In some implementations, the at least one seal hopper means comprises a plurality of seal hopper means storing at least two different types of seals. In some implementations, the seal applicator means comprises 8 seal applicator device means that are collectively translatable along the first axis and the third axis and wherein the seal singulation means comprises 8 seal singulation device means that are each translatable along the second axis.

In some implementations, the wire stripping means removes two opposing end portions of the insulation of the wire to provide first and second exposed end portions of the wire, and the seal applicator means translates along the first axis to install first and second target seals proximate to the first and second exposed end portions of the wire, respectively, to obtain the sealed wire.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 10A-10C illustrate overhead views of the example seal applicator system during seal installation on first and second exposed end portions of a wire according to some implementations of the present disclosure.

DETAILED DESCRIPTION

As discussed above, a wired connector or wire harness typically comprises a plurality of wire leads having their terminals inserted into and secured within respective terminal portions of a connector. During assembly of wired connectors, a human or robotic assembler typically follows a set of instructions (a wire diagram, computer-executable instructions, etc.) whereby a container or bin of wire leads is searched through to identify a target wire lead, which is then installed by the assembler into a respective target terminal portion of a connector. This process can be costly and time consuming and can also result in a large number of wire leads or wired connectors not passing testing, leading to decreased first time quality (FTQ) metrics and increased costs to fix improperly assembled wire leads and/or wired connectors. Thus, while these conventional assembly systems and methods work well for their intended purpose, an opportunity exists for improvement in the relevant art. Accordingly, improved wire lead and wired connector assembly systems and methods are presented herein.

These systems and methods utilize an automated wire kitting system that robotically prepares wires and terminals and crimp presses terminals onto respective wires. The assembled wire leads are then provided to a wire lead singulation system, which can be delivered to a wired connector assembly station where a human or robotic installer can follow a specific set of instructions (e.g., left-to-right along a pallet) to quickly and accurately assembly the wired connector. The terminal preparation and singulation allows for multiple different types of terminals (e.g., eight) to be singulated and delivered to the crimp press. The crimp press also includes a shuttle system comprising a plurality of different dies (e.g., eight) such that the different types of terminals can be properly crimped onto the prepared wires. A removable wedge feature supports the crimp press during crimping while also allowing for changing of the engaged die. These improved systems and methods can increase FTQ metrics and decreasing costs to fix improperly assembled wired connectors. In addition, less extensive training/knowledge by human assemblers is required, which could further decrease costs and provide for more task flexibility at an assembly plant or facility.

Figure 1A:
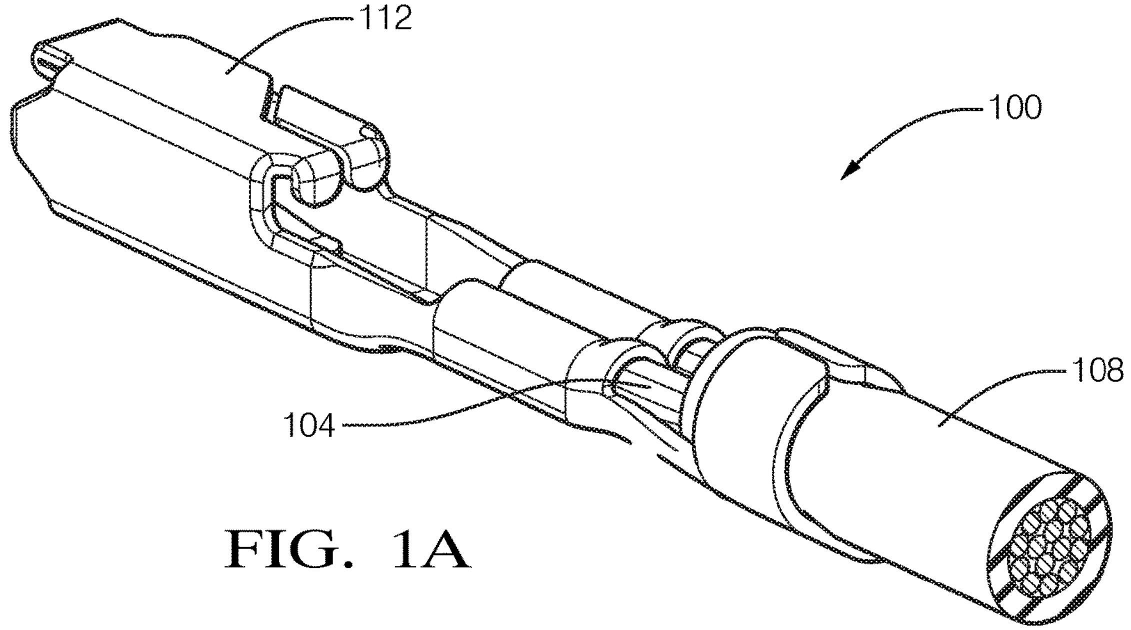
FIGS. 1A-1B illustrate views of an example wire lead and an example wired connector having a plurality of wire leads inserted therein according to some implementations of the present disclosure.
Figure 1B:
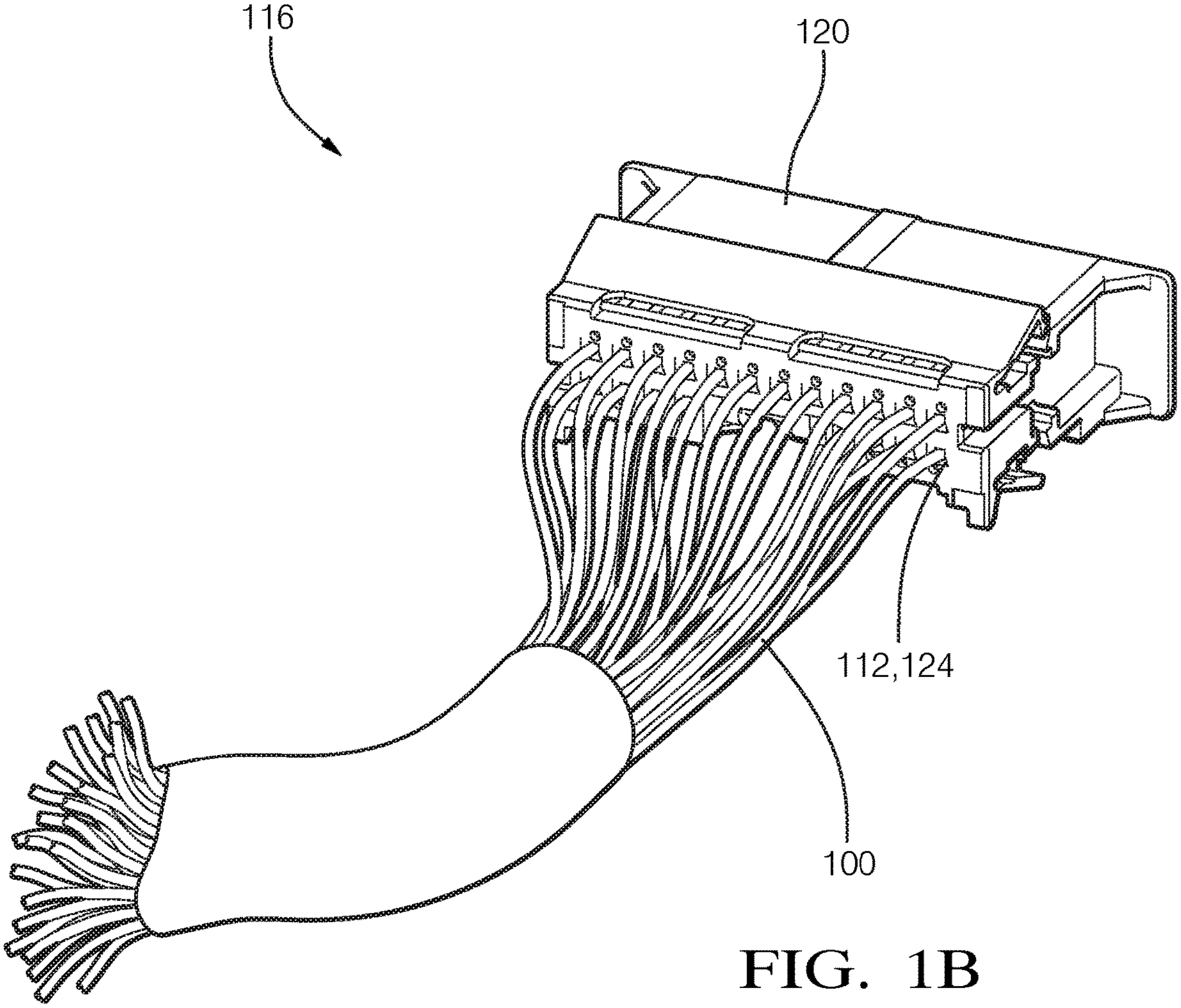

Referring now to FIGS. 1A-1B, views of an example wire lead 100 and an example wired connector 116 are illustrated. The wire lead 100 comprises a wire 104 having a portion of an insulation 108 stripped away in order to have a terminal 112 crimped thereon. It will be appreciated that the term "insulation" can refer to any suitable insulating or shielding material to protect the wire 104. While the wire 104 is shown as a round collection of thinner wires, it will be appreciated that the wire 104 could be a single wire and/or could have a different shape or collective shape. For purposes of this disclosure, the wire 104 and the insulation 108 are also collectively referred to as "insulated wire 104, 108" or "target wire 104, 108." The wired connector 116 comprises a plurality of wire leads having their respective terminals 112 seated or connected to respective terminal portions 124 of a connector 120. While many wired connectors include a plurality of wire leads 100 seated in a plurality of respective terminal portions 124, it will be appreciated that in some implementations the wired connector 116 could comprise a single wire lead 100 seated in a single respective terminal portion 124. As discussed above, the typical assembly method for the wired connector 116 is the "push-click-tug" procedure where each wire lead 100 is "pushed" into the respective terminal portion 124 until a "click" indication is observed (a sound, a vibration, etc.) and the seating is then tested and verified by a "tug" on the wire. As previously discussed and as shown in FIG. 1B, there can be a large number of wire leads 100 seated in the connector 120, which can be complex and time consuming, particularly for a human installer (e.g., following a visual wiring diagram and searching through containers of different wire leads).

Figure 2:
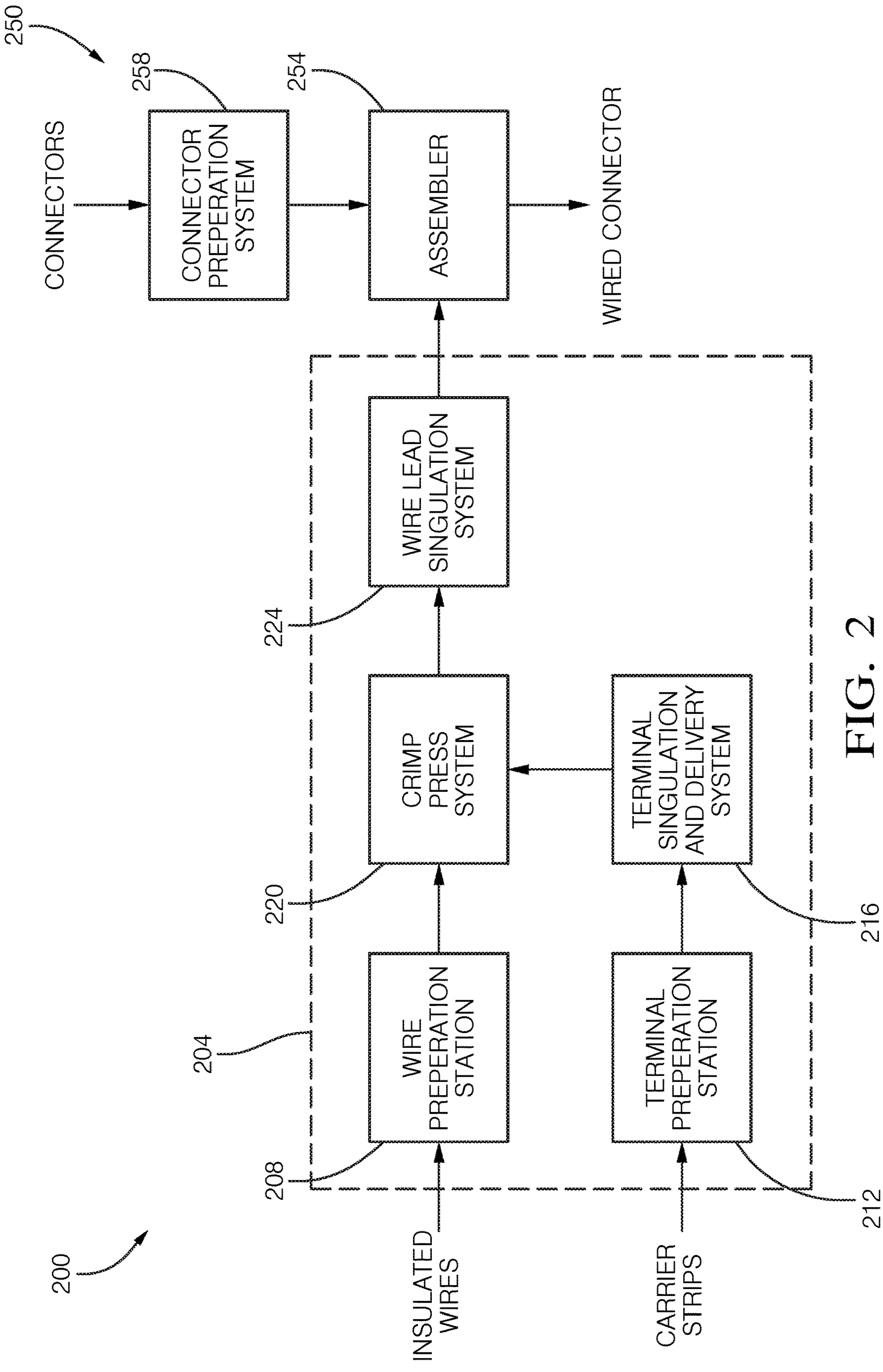
FIG. 2 illustrates a functional block diagram of an example automated wire kitting system and wired connector assembly system according to some implementations of the present disclosure.

Referring now to FIG. 2 and with continued reference to the components of FIGS. 1A-1B, a functional block diagram of an example automated wire kitting and wired connector assembly system 200 according to some implementations of the present disclosure is illustrated. The system 200 is generally divided into two primary systems or sub-systems: an automated wire kitting system 204 that assembles and singulates wire leads 100 and a wired connector assembly system 250 that assembles wired connectors 116 using the produced wire leads 100. In one exemplary implementation, the automated wire kitting system 204 comprises a wire preparation station 208, a terminal preparation station 212, a terminal singulation and delivery system 216, a crimp press system 220, and a wire lead singulation system 224. It will be appreciated that the terms station and system can be used interchangeably and have the same meaning for the purposes of this disclosure (e.g., a portion of an assembly line). The wire preparation station 208 receives insulated wires 104, 108 and prepares the insulated wires 104, 108 for the assembly of wire leads 100. These insulated wires 104, 108 could be provided, for example, from rolls or coils each storing a different type or size of insulated wire 104, 108. The preparation of the insulated wires 104, 108 can include, but is not limited to and in no particular order, uncoiling, untwisting, measuring a desired length, cutting at the desired length, stripping a portion of the insulation, and adding or installing a seal. Each prepared insulated wire 104, 108 is then singulated and provided to the crimp press system 220 as shown and described in greater detail below.

Figure 3A:
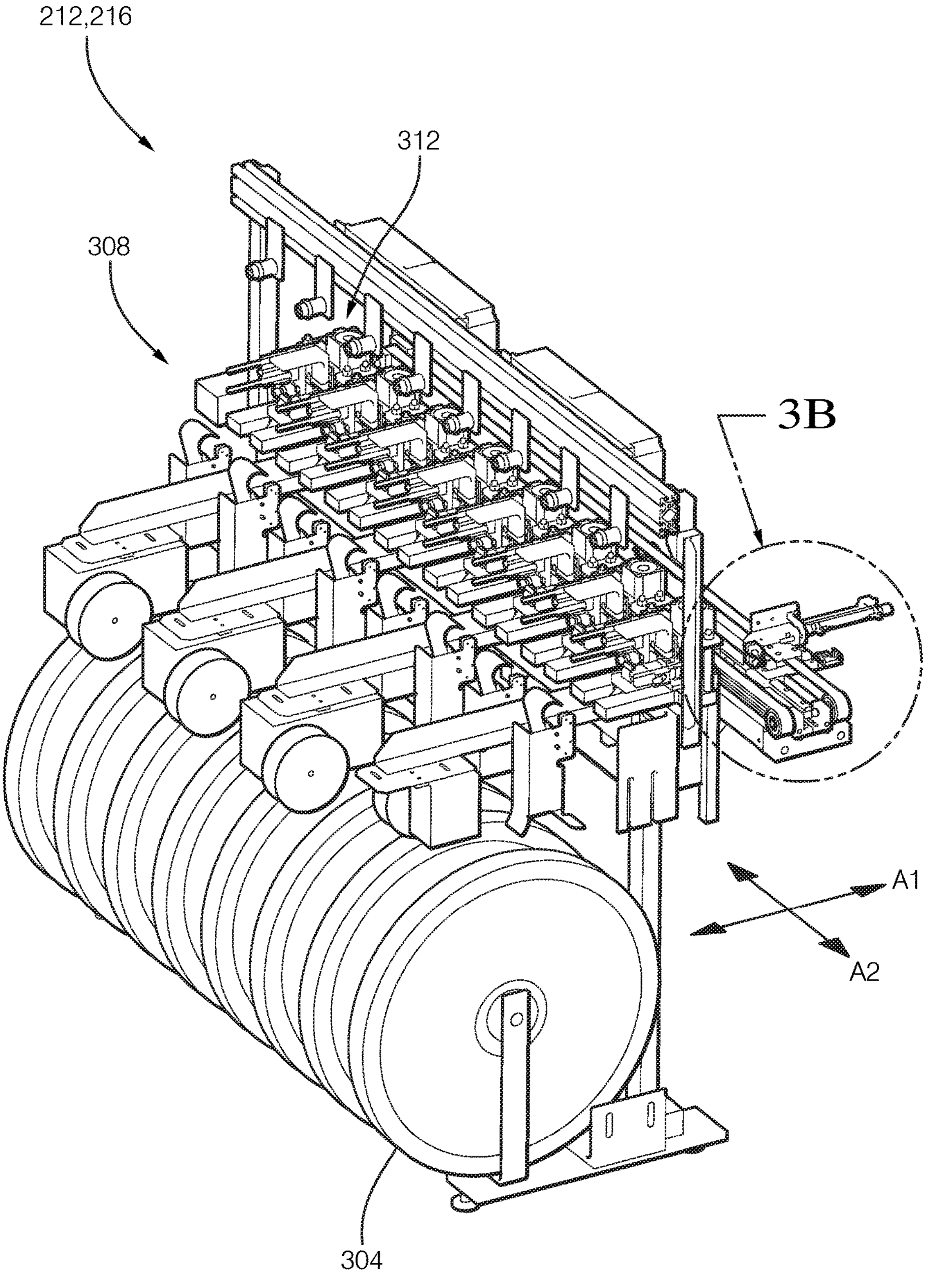
FIGS. 3A-3B illustrate views of a terminal preparation station and a portion of a terminal singulation and delivery system of the automated wire kitting system according to some implementations of the present disclosure.
Figure 3B:
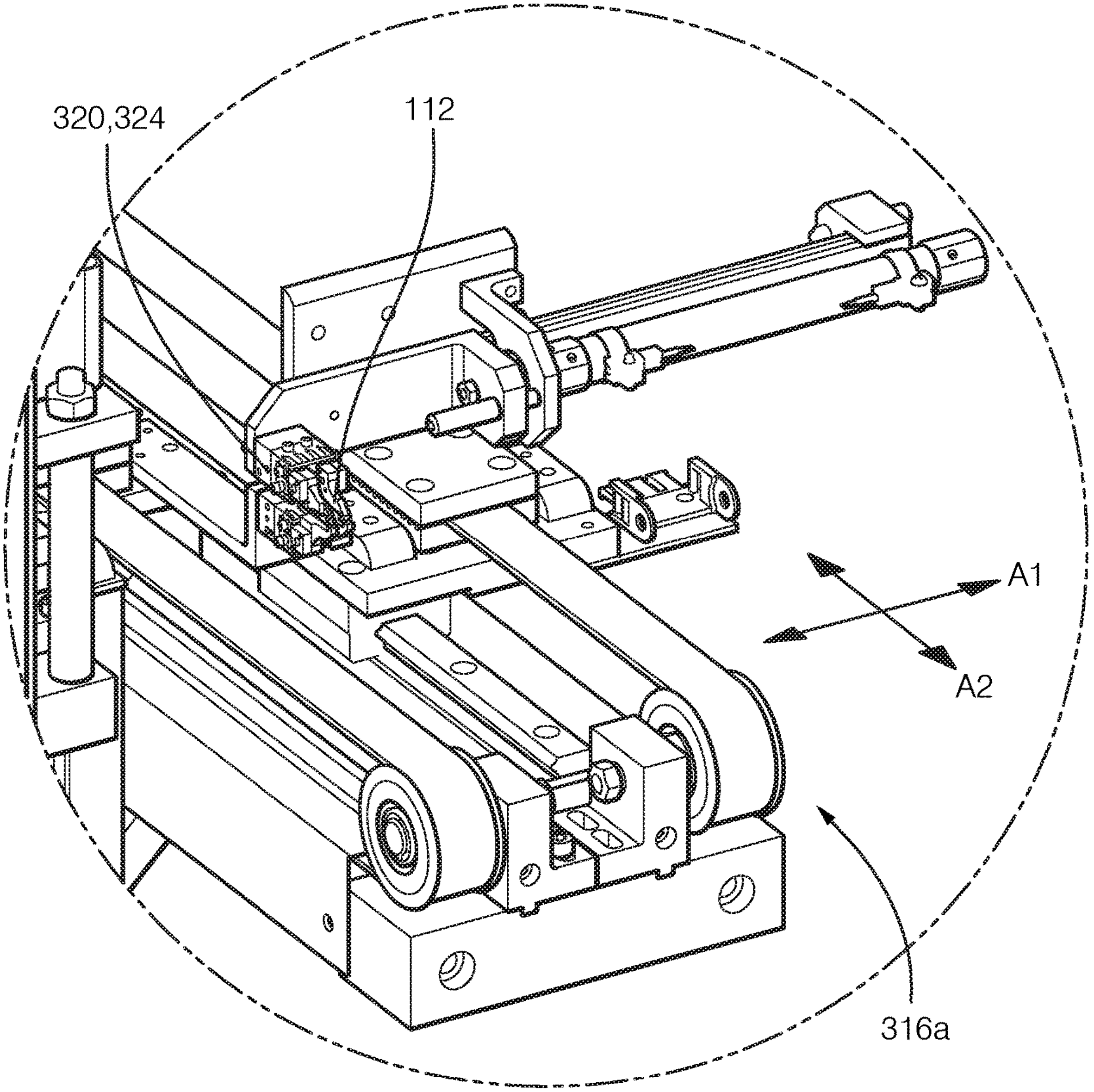

Referring now to FIGS. 3A-3B and with continued reference to the FIGS. discussed above, the terminal preparation station 212 receives carrier strips of terminals 112 and prepares the terminals 112 for the assembly of wire leads 100. These carrier strips could be provided, for example, from rolls or coils 304 each storing a different type of carrier strip of terminals 112. The preparation of the terminals 112 can include, for example, cutting the carrier strips of terminals 112 using cutting dies 308 and storing the cut terminals 112 in respective terminal containers 312. In one exemplary implementation, there are eight terminal containers 312 each storing a different type of terminal 112. The terminal singulation and delivery system 216 then singulates a target terminal 112 from a target one of the terminal containers 312 using a first transport system 316*a*. In one exemplary implementation, the first transport system 316*a* comprises a first gripping device 320 having first opposing gripping members 324 configured to grip and control movement of the target terminal 112. In one exemplary implementation, the first gripping device 320 or a separate sensor system (e.g., a visual scanning system, not shown) is configured to identify opposing target gripping points on the target terminal and movably close the first opposing gripping members 324 on the opposing target gripping points on the target terminal 112 to control movement of the target terminal 112 from the target terminal container 312. In one exemplary implementation, the terminal singulation and delivery system 216 is configured to translate along a first axis (A1) parallel to the plurality of terminal containers 312 (parallel to the shown roller belts) to control movement of the target terminal 112 from the target terminal container 312 and translate along a second axis (A2) perpendicular to the first axis A1 to deliver and transfer the target terminal 112 to a second transport system 316*b*.

Figure 4A:
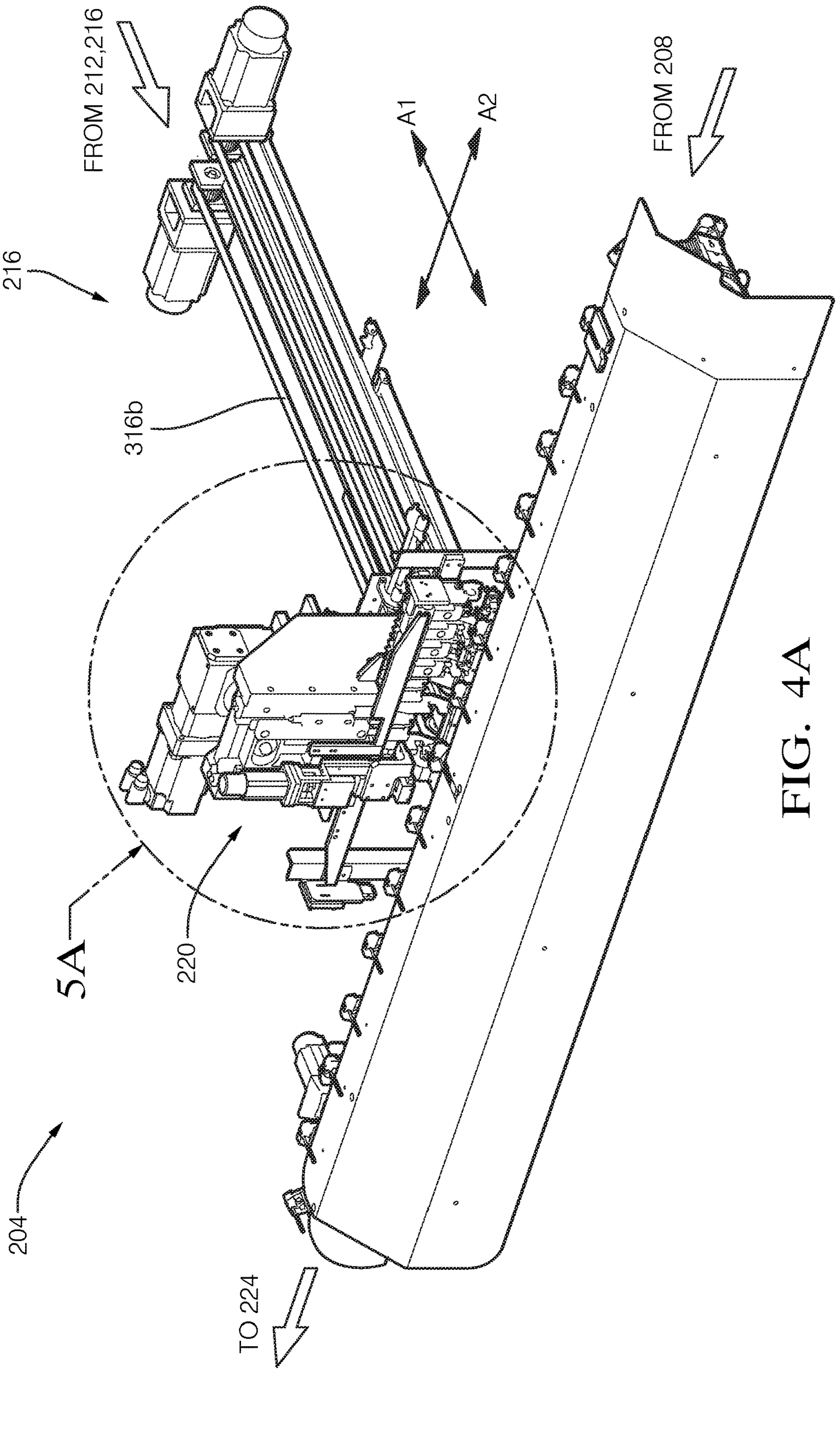
FIGS. 4A-4B illustrate views of a portion of the terminal singulation and delivery system and the crimp press system of the automated wire kitting system according to some implementations of the present disclosure.
Figure 4B:
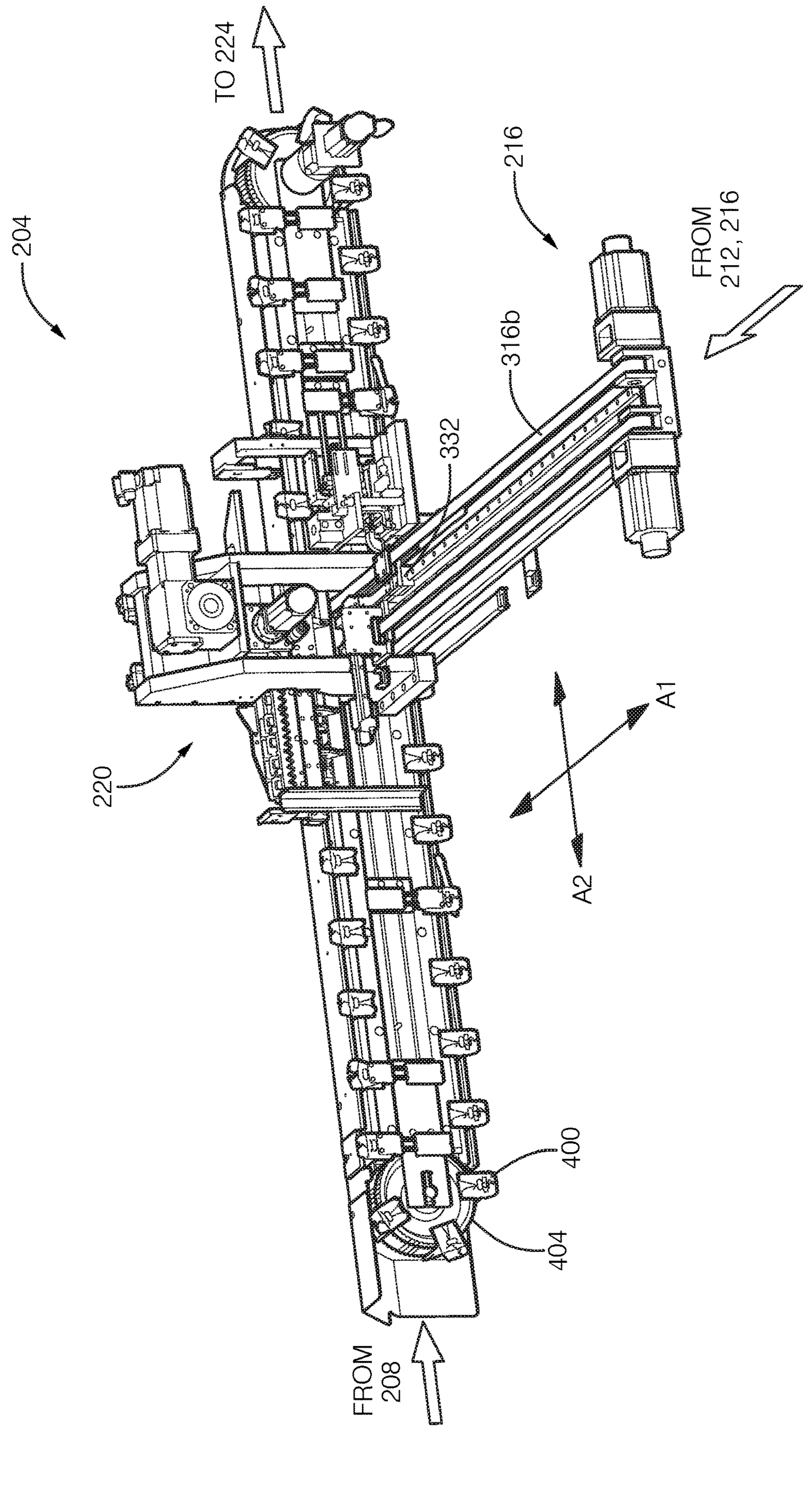

Referring now to FIGS. 4A-4B and with continued reference to the other FIGS. discussed above, the second transport system 316*b* is configured to receive the target terminal 112 from the first transport system 316*a* and to deliver the target terminal to the crimp press system 220. In one exemplary implementation, the second transport system 316*b* comprises a second gripping device 332 having second opposing gripping members (similar to opposing gripping members 324) configured to grip and control movement of the target terminal 112 from the first gripping device 320. The second gripping device 332, for example, could be arranged approximately 180 degrees relative to the first gripping device 320. This allows for a hand-off procedure where the target terminal is then ready for appropriate delivery to the crimp press system 220. More specifically, in this exemplary implementation, the second gripping device 332 is further configured to translate along the second axis A2 to control movement of the target terminal 112 from the first gripping device 320 and translate along at least the second axis A2 to deliver the target terminal 112 to the crimp press system 220. In the illustrated example configuration, the second gripping device 332 is configured to control movement of the target terminal 112 from the first gripping device 320 at a first position behind the crimp press system 220 and then translate along the second axis A2 to a second position in front of the crimp press system 220 as shown in FIGS. 5A-5B.

Figure 5A:
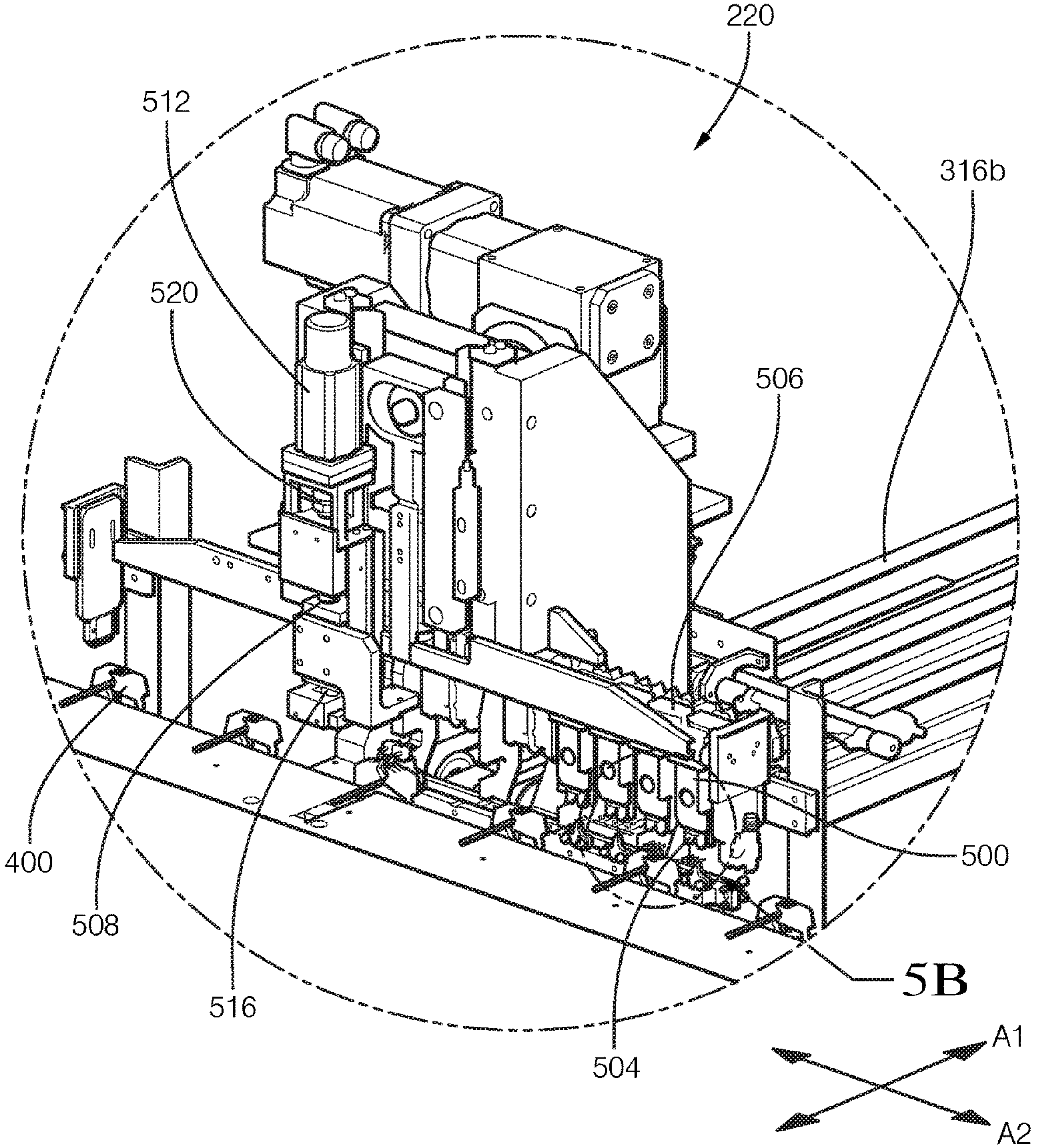
FIGS. 5A-5B illustrate views of the crimp press system of the automated wire kitting system according to some implementations of the present disclosure.
Figure 5B:
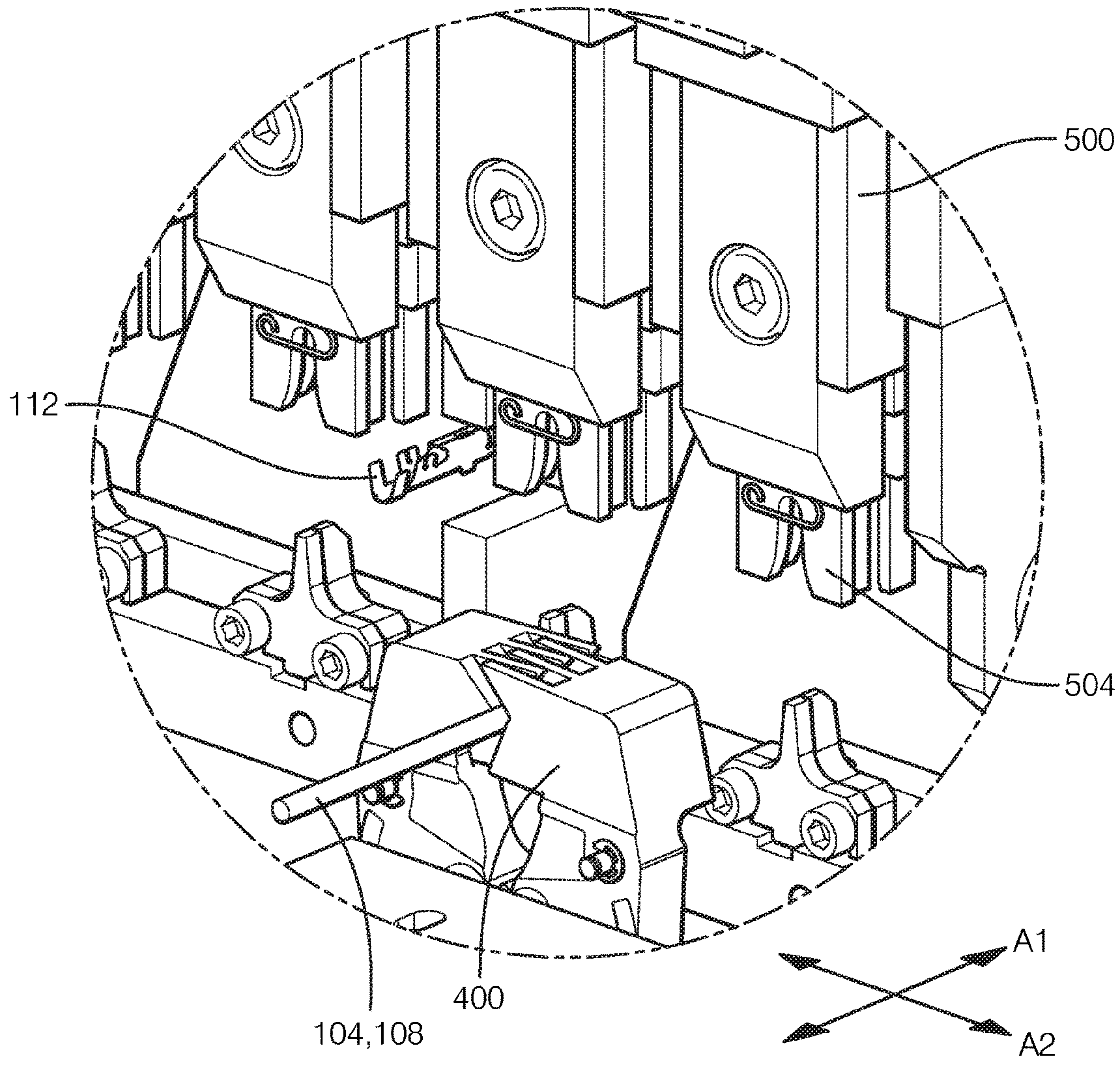

Referring now to FIGS. 5A-5B and with continued reference to the FIGS. discussed above, the crimp press system 220 (also referred to herein as "crimp press 220") comprises a shuttle system 500 comprising a plurality of different dies 504 where a target die 508 is engaged and a remainder of the plurality of dies 504 that are not engaged are vertically retained or secure by securing mechanisms 506. In one exemplary implementation, the shuttle system 500 comprises eight different dies 504. The shuttle system 500 is translatable along the first axis A1 to position a target die 508 for engagement. along a third axis (vertical, not shown) perpendicular to the first and second axes in order to engage and disengage the target die 506. This third axis is also the direction that the crimp pressing occurs. While these axes are described as being the same as the first and second axes of the previous FIGS. for reference purposes, it will be appreciated that there could be some differences in the orientation of the respective systems. The crimp press system 220 obtains a target wire 104, 108, after preparation by the wire preparation system 208, which has been singulated by respective wire gripper members 400 translatable back and forth along the second axis A2 via a drive system 404. It will be appreciated that the gripping members 400 (e.g., and drive system 404) could also be utilized as part of the wire preparation system 208. As shown, the target terminal 112 is delivered to the crimp press system 220 along with the target wire 104, 108. The crimp press system 220 then commands a press 512 to generate a force via the engaged or target die 508 to crimp the target terminal 112 onto the exposed wire portion 104 to assemble the wire lead 100. In one exemplary implementation, the crimp press system 220 further comprises a wedge mechanism 516 configured to be (i) temporarily inserted beneath a bottom portion of the target die 508 when engaged to increase a rigidity of the target die during crimping and (ii) removed from beneath the bottom portion of the target die 508 when vertically disengaging the target die 508 along the third axis (vertical).

In one exemplary implementation, the engaged target die 508 receives the target terminal 112 in first and second portions that are initially vertically spaced apart and the wire gripping members 400 and the drive system 404 deliver the target wire 104, 108 to a front portion of the crimp press system 220 such that the exposed wire portion 104 is aligned between the first and second portions of the target terminal 112 and then the wire gripping members 400 push the wire downward along the third axis such that the exposed wire portion 104 engages or is proximate to the second portion of the target terminal 112 and the press 512 then generates the crimping force via the target die 508 to crimp the target terminal 112 onto the exposed wire portion 104. In one exemplary implementation, the crimp press system 220 further comprises a single load sensor 520 that is configured to be engageable with each of the plurality of dies 504 (i.e., whichever die 504 is engaged, or the target die 508). When engaged with the target die 508, the load sensor 520 is configured to measure the crimping force generated by the press 512 via the target die 508 as part of a crimp force monitoring (CFM) process. This load sensor 520, for example, could be engageable with each of the dies 504 and vertically retained using a nail-head type connection or any other suitable type of temporary engagement mechanism. By being able to use a single load sensor 520 for all of the plurality of dies 504, costs can be reduced (e.g., compared to needing separate, permanent load sensors 520 for each of the plurality of dies 504. Each assembled wire lead 100 is then fed by the wire gripping members 400 and the drive system 404 to the wire lead singulation system 524.

Figure 6A:
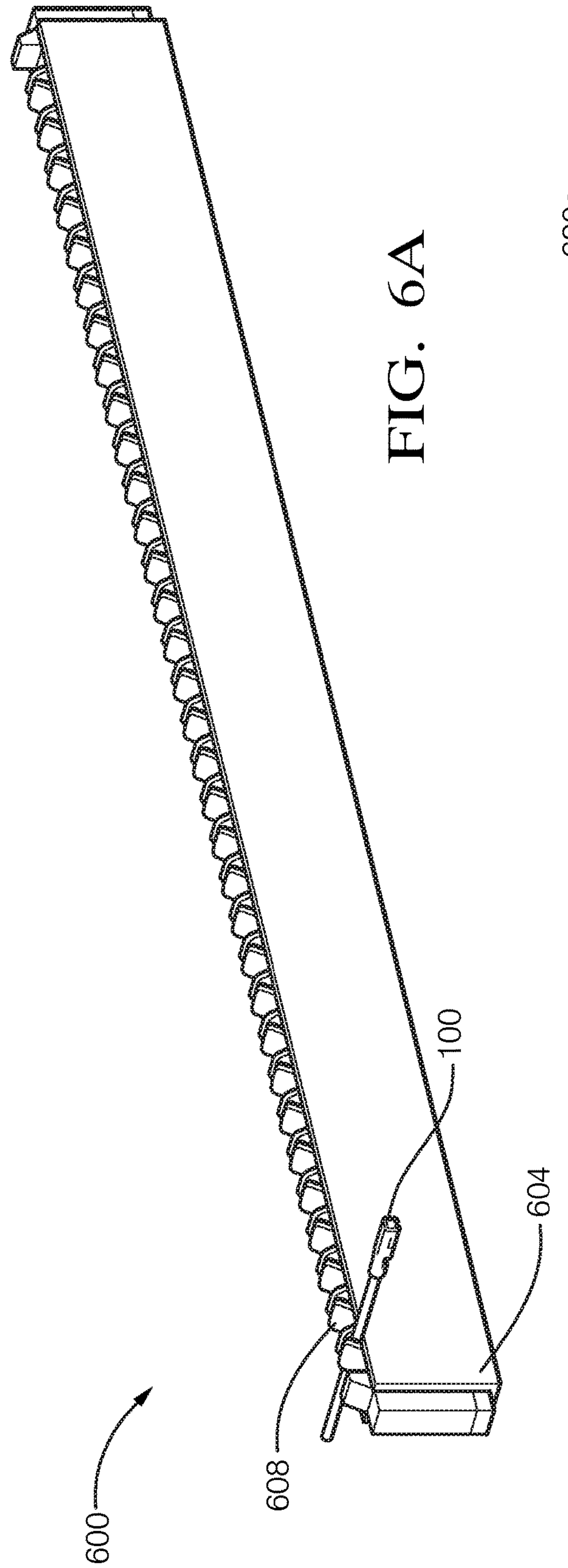
FIGS. 6A-6C illustrate views of a wire lead singulation system of the automated wire kitting system according to some implementations of the present disclosure.
Figure 6C:
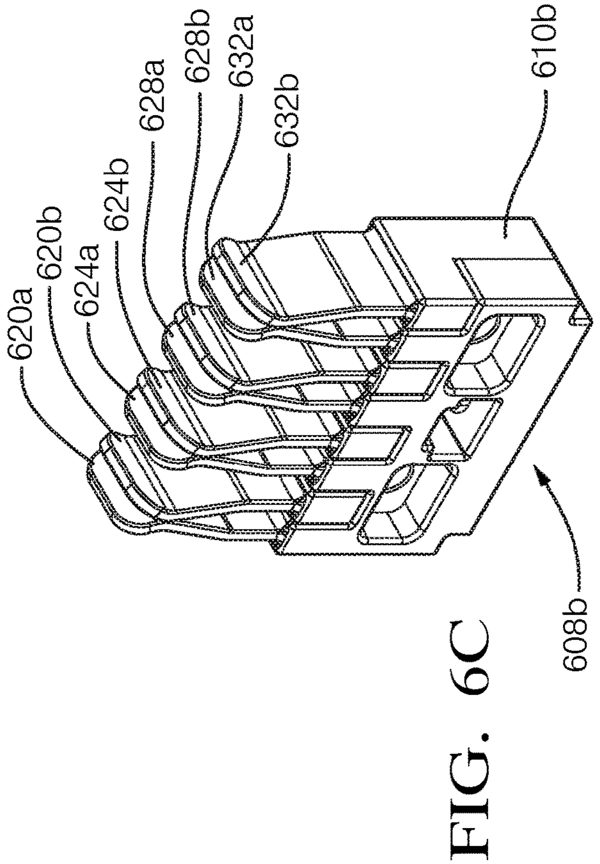
Figure 6B:
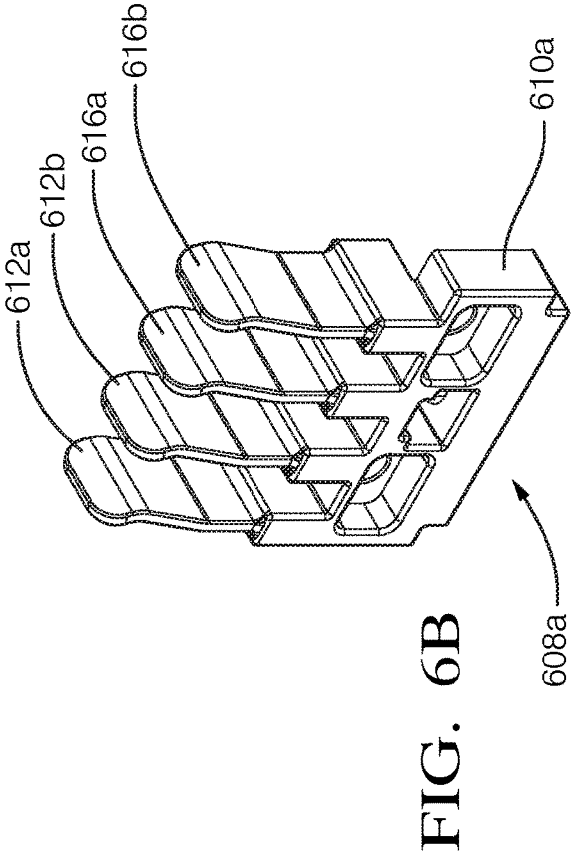

Referring now to FIGS. 6A-6C and with continued reference to the FIGS. discussed above, an example configuration of the wire lead singulation system 600 according to some implementations of the present disclosure is illustrated. The wire lead singulation system 600 comprises a base member 604 having a plurality of independent singulation devices 608 attached to or defined by the base member 604, wherein each singulation device 608 of the plurality of independent singulation devices 608 is configured to receive and temporarily secure one of the plurality of wire leads 100. In one exemplary implementation, the base member 604 is a pallet-like device configured for transportation within or to an assembly facility. In one exemplary implementation, the gripping members 400 are further configured to insert and temporarily secure the plurality of wire leads 100 in the plurality of independent singulation devices 608 of the wire lead singulation system 600. It will be appreciated, that there could be another intermediary system that may obtain the wire leads 100 from the wire gripping members 400 and drive system 404 and then insert the wire leads 100 into the plurality of independent singulation devices 100. This could be a robotic/automated system or could be performed manually by a human. In one exemplary implementation, the plurality of wire leads 100 are inserted and temporarily secured the in the plurality of independent singulation devices 608 according to a predefined order or pattern.

This predefined order or pattern could, for example, correspond to a specific installation order or pattern that the plurality of wire leads 100 will be inserted into respective terminal portions 126 of the wired connector 116 during assembly thereof by the assembler 254 of the wired connector assembly system 250. As previously discussed, the assembler 254 could be a robotic assembler or a human assembler that receives the plurality of wire leads 100 and, in response to this delivery via the wire lead singulation system 600, seats the plurality of wire leads 100 into respective terminal portions 124 of the target connector 120 as provided by a connector preparation system 258 (e.g., a storage system of different connector types where the target connector 120 is manually or robotically singulated). In the robotic configuration of the assembler 254, the assembler 254 could operate according to a set of installation instructions that correspond to the specific installation order or pattern. In the manual or human configuration, the specific installation order or pattern is left-to-right or right-to-left (e.g., easy to follow for any human installer, even those with minimal experience or training). This could eliminate the need for complex wiring diagrams that are hard to follow.

The plurality of independent singulation devices 608 could have a variety of different configurations. In one exemplary implementation, the plurality of independent singulation devices 608 are spring-loaded metal grip fingers. Metallic fingers, however, could be too rigid and thus could possibly damage the wire leads 100. As shown in FIGS. 6A-6B, in another exemplary implementation, the plurality of independent singulation devices 608 are plastic (e.g., injection molded) grip fingers. FIG. 6A illustrates a first example configuration 608*a* where a base portion 610*a* has four fingers 612*a*-12*d* extending therefrom. The wire leads 100 could then be inserted and temporarily secured between neighboring pairs of these fingers 612*a*-612*d*. FIG. 6B illustrates a second configuration 608*b* where a base portion has eight fingers extending therefrom divided into four pairs: 620*a*-620*b*, 624*a*-624*b*, 628*a*-628*b*, and 632*a*-632*b*. The wire leads 100 could then be inserted and temporarily secured between each finger pair. This configuration 608*b*, for example, may provide more securing force compared to the other configuration 608*a*. It will be appreciated that these configurations are merely examples and that any type of temporary securing mechanism for the wire leads 100 could be utilized for the wire lead singulation system 600.

Figure 7A:
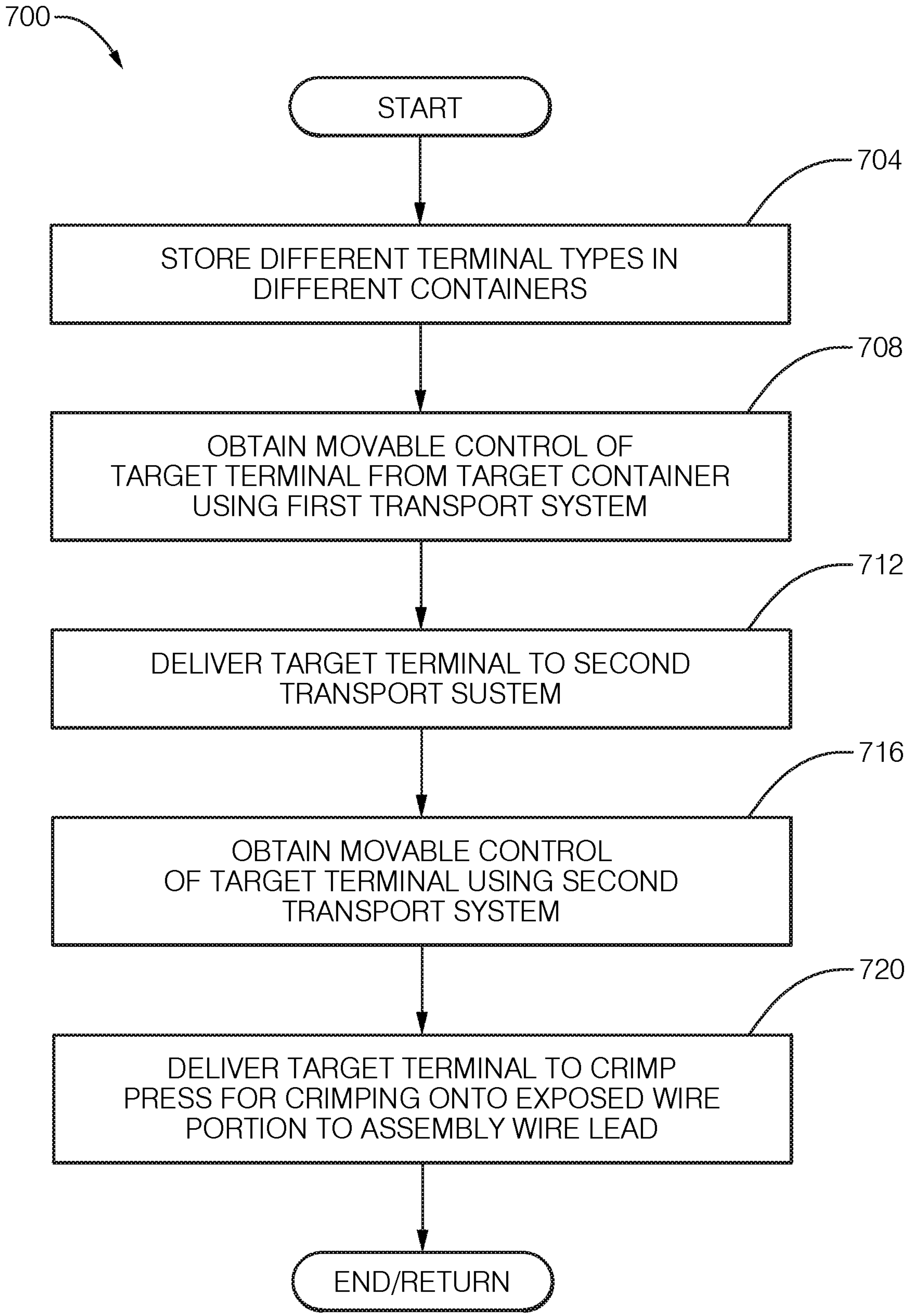
FIGS. 7A-7C illustrate flow diagrams of example automated wire kitting methods according to some implementations of the present disclosure.
Figure 7B:
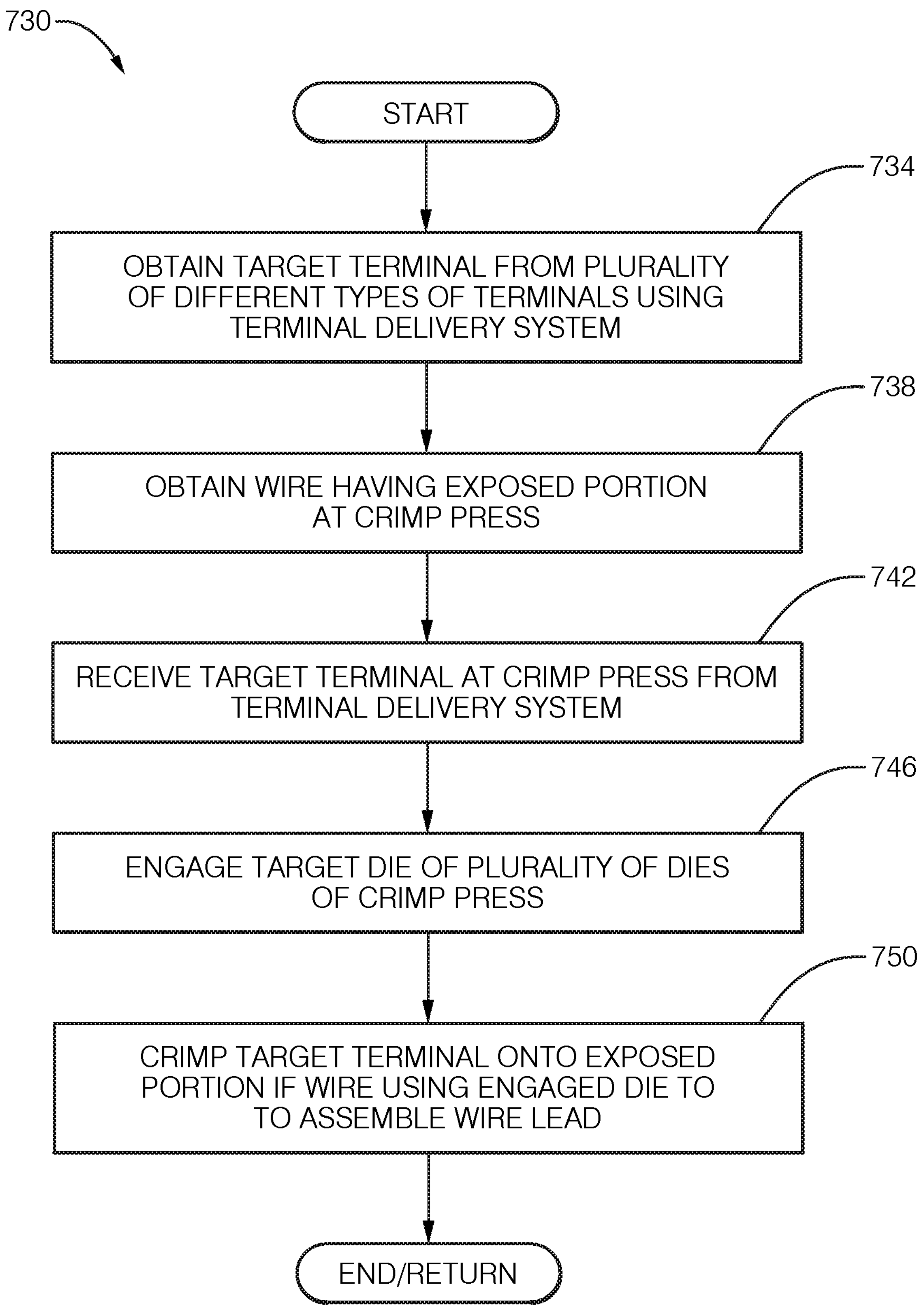

Referring now to FIGS. 7A-7B, example flow diagrams of automated wire kitting methods 700, 730, 760 according to the principles of the present disclosure are illustrated. While these methods 700, 730, and 760 reference the components of the automated wire kitting and wired connector assembly system 200, it will be appreciated that these methods 700, 730, and 760 could be achieved using differently configured systems or systems having additional or fewer components than system 200. The method 700 of FIG. 7A begins at 704 where different types of terminals 112 are stored in different terminal containers 312. At 708, movable control of the target terminal 112 from the target terminal container 312 is obtained using the first transport system 316*a*. At 712, the first transport system 316*a* delivers the target terminal 112 to the second transport system 316*b*. At 716, the second transport system 316*b* obtains movable control of the target terminal 112 from the first transport system 316*a*. At 718, the second transport system 316*b* delivers the target terminal 112 to the crimp press system 220 for crimping onto the exposed wire portion 104 to assemble the wire lead 100. The method 700 then ends or returns to 704.

Figure 7C:
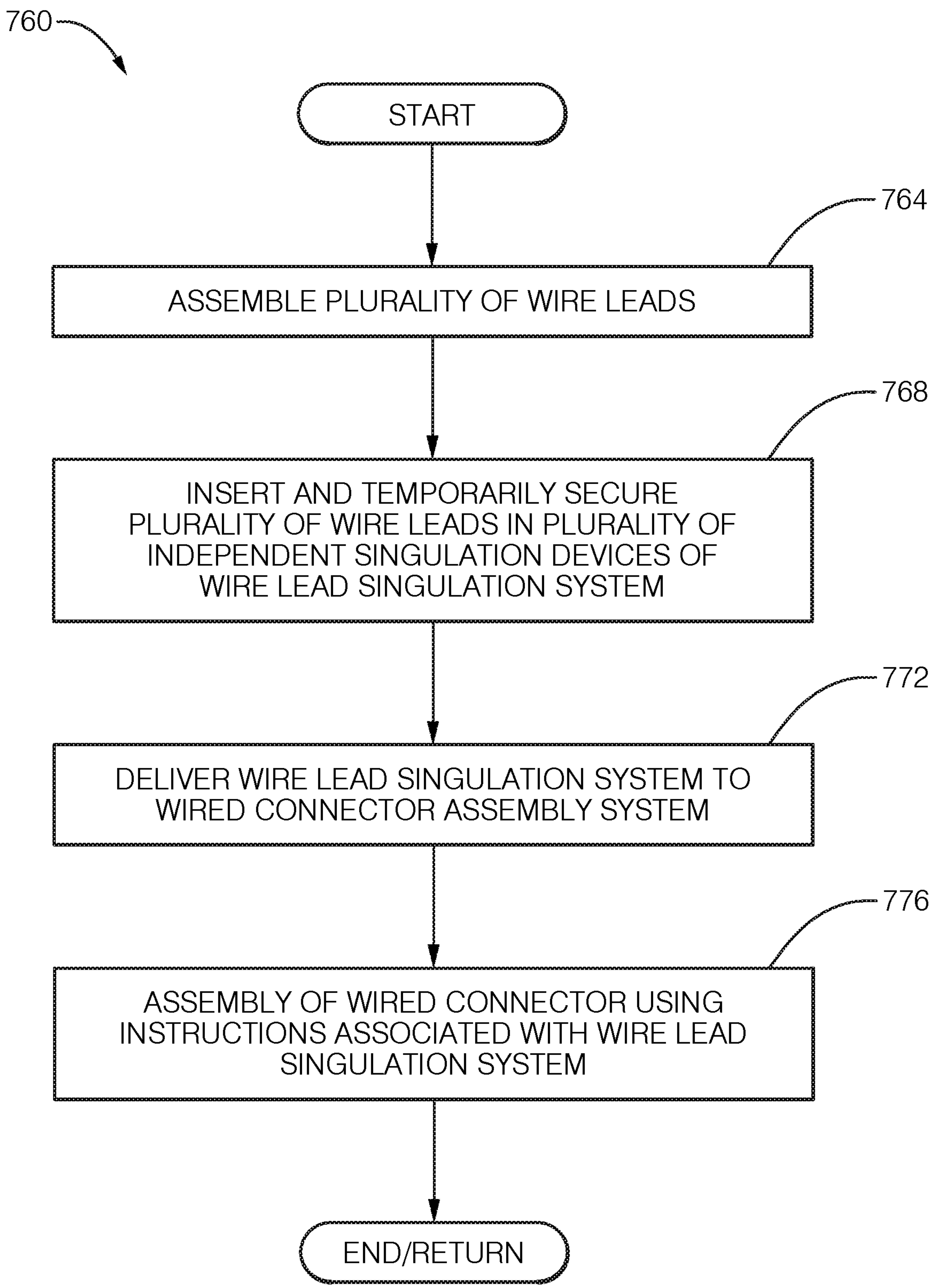
Figure 8A:
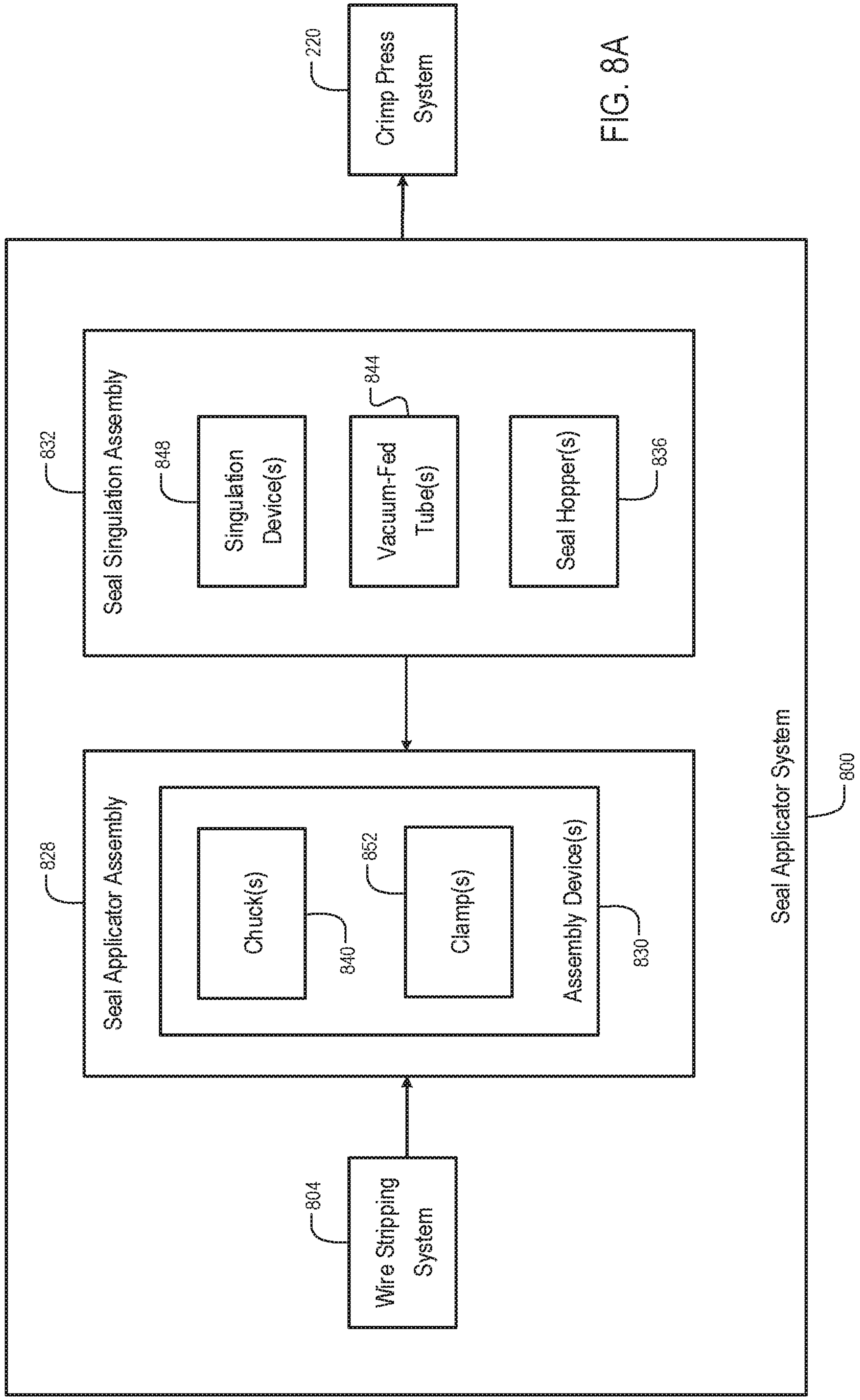
FIGS. 8A-8D illustrate schematic, perspective, front, and side views of an example seal applicator system of the automated wire kitting system according to some implementations of the present disclosure.
Figure 8B:
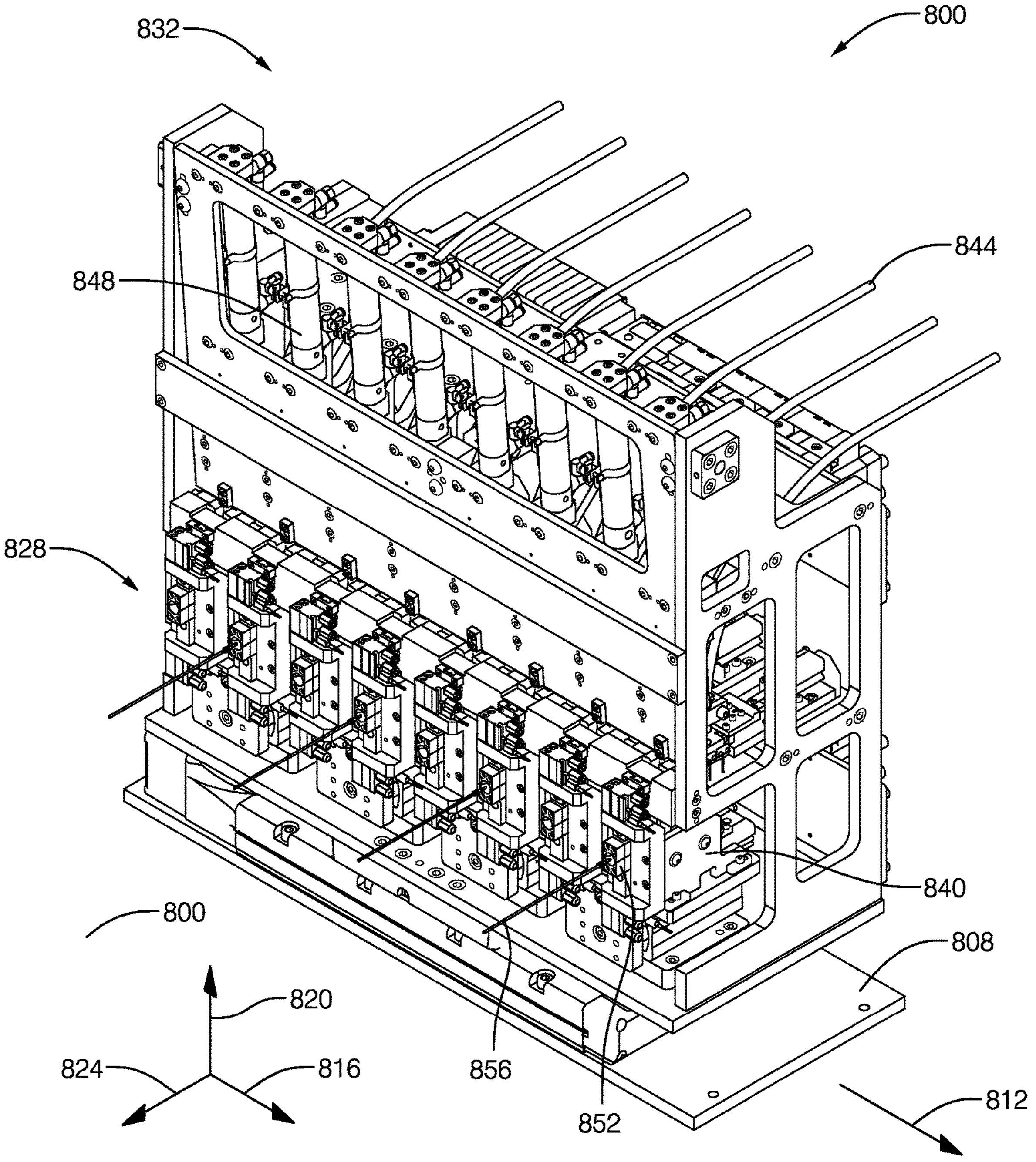
Figure 8D:
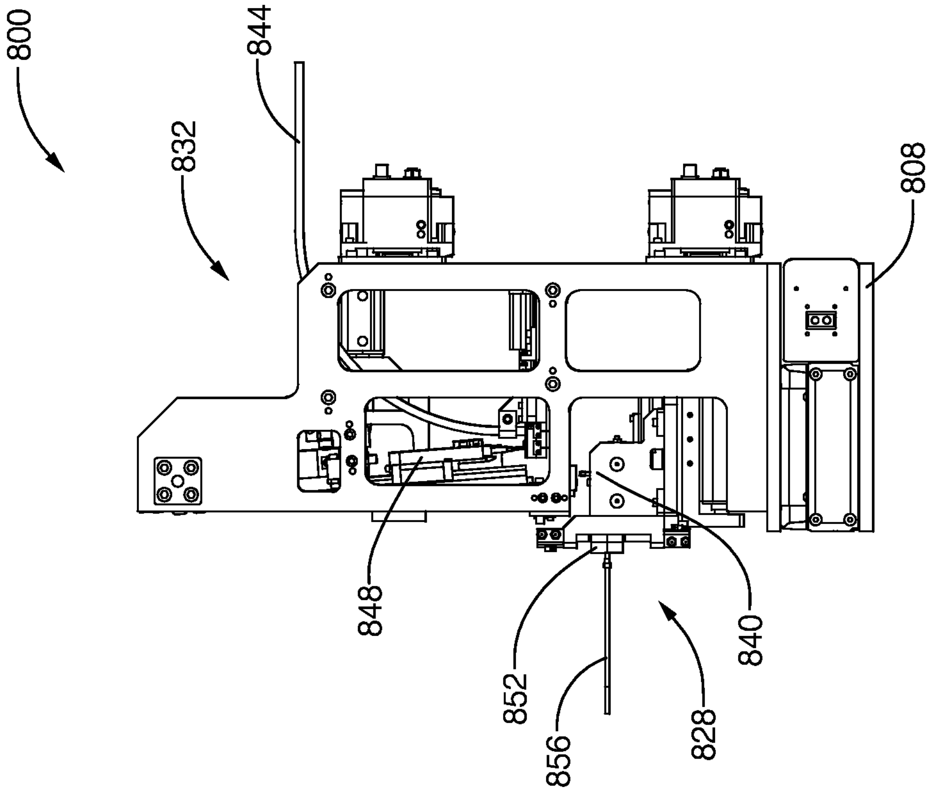
Figure 8C:
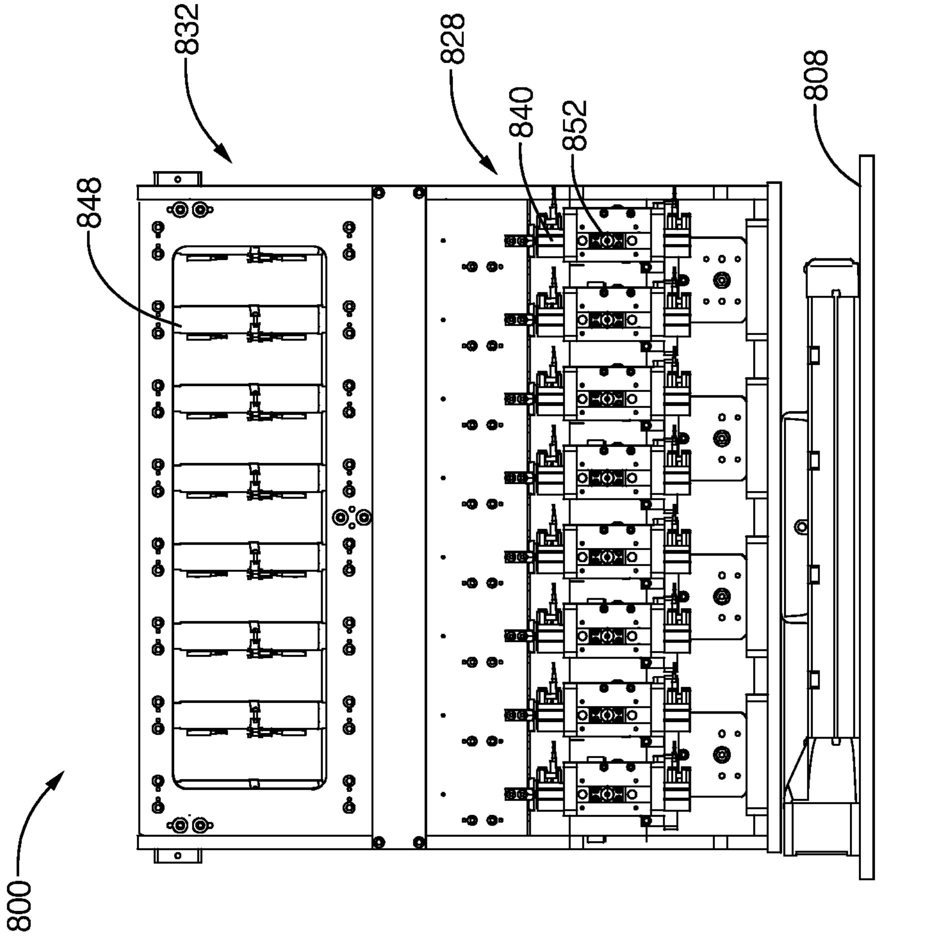

The method 730 of FIG. 7B begins at 734 where the target terminal 112 is obtained from a plurality of different types of terminals (e.g., terminal containers 312) using the terminal singulation and delivery system 216. At 738, the crimp press system 220 obtains the target wire 104, 108. At 742, the terminal singulation and delivery system 216 provides the target terminal 112 to the crimp press system 220. At 746, the target die 508 of the plurality of dies 504 is engaged. At 750, the crimp press system 220 crimps the target terminal 112 onto the exposed wire portion 104 using the target die 508 to assembly the wire lead 100. The method 730 then ends or returns to 734. The method 760 of FIG. 7C begins at 764 where the plurality of wire leads 100 are assembled (e.g., using automated kitting system 204). At 768, the plurality of wire leads 100 are temporarily inserted and secured in a plurality of independent singulation devices 608 of the wire lead singulation system 600. At 772, the wire lead singulation system 600 is delivered to the wired connector assembly system 250. At 776, the wired connector 116 is assembled (e.g., by assembler 254) using instructions associated with the wire lead singulation system 600 (left-to-right, right-to-left, computer instructions, etc.). The method 760 then ends or returns to 764.

As previously described, the wire preparation station 208 receives insulated wires 104, 108 and prepares the insulated wires 104, 108 for the assembly of wire leads 100. These insulated wires 104, 108 could be provided, for example, from rolls or coils each storing a different type or size of insulated wire 104, 108. The preparation of the insulated wires 104, 108 can include, but is not limited to and in no particular order, uncoiling, untwisting, measuring a desired length, cutting at the desired length, stripping a portion of the insulation, and adding or installing a seal.

Referring now to FIG. 8A-8D, a functional block diagram along with perspective, front, and side views of an example seal applicator system 800 according to some implementations of the present disclosure are illustrated. As previously discussed, the seal applicator system 800 is part of the wire preparation station 208 and also interacts with a wire stripping system 804 that is part of the wire preparation station 208. The wire stripping system 804 is configured to remove at least a portion of an insulation of target wire(s) to provide exposed portion(s) of the target wire(s). In some implementations, the wire stripping system 804 is configured to remove two opposing end portions of the insulation of a particular target wire to provide first and second exposed end portions of the target wire. The seal applicator system 800 can also be configured to provide the sealed wire to the crimp press system 220 for subsequent crimping of target terminal(s) onto the exposed portion(s) of the sealed wire(s) to assemble wire lead(s) as described in greater detail previously herein.

The seal applicator system 800 generally comprises a frame 808 that is arranged generally parallel to an assembly direction 812 of the overall system 200 of the present disclosure. This assembly direction 812 is also generally parallel to a first direction or axis 816 along which component(s) of the seal applicator system 800 are capable of moving, in addition to perpendicular second and third directions/axes 820, 824. The seal applicator assembly 800 comprises a seal applicator assembly 828 supported by the frame 808 and configured to translate along the first axis 816 to install target seal(s) proximate to the exposed portion(s) of the wire(s) to obtain sealed wire(s). The seal applicator system 800 further comprises a seal singulation assembly 832 configured to obtain the target seal(s) from at least one seal hopper 836 each storing a particular type of seal and downwardly feed the target seal(s) along the second axis 820 to the seal applicator assembly 828. In some implementations, the seal applicator assembly 828 comprises one or more chucks 840 each configured to receive a target seal and further configured to translate along the third axis 824 while installing the target seal(s).

In some implementations, the seal singulation assembly 832 is configured to obtain the target seal from the at least one seal hopper 836 via one or more vacuum-fed tube(s) 844. In some implementations, the at least one seal hopper 836 comprises a plurality of seal hoppers storing at least two different types of seals. In one exemplary implementation, the seal applicator assembly 828 comprises eight seal applicator devices 830 that are collectively translatable along the first axis 816 and the third axis 824 and wherein the seal singulation assembly 832 comprises eight seal singulation devices 848 that are each translatable along the second axis 820. In the case of a particular target wire having two opposing exposed end portions, the seal applicator assembly 828 can be configured to translate along the first axis to install first and second target seals proximate to the first and second exposed end portions of the wire, respectively, to obtain a sealed wire. This process is shown in greater detail in FIGS. 10A-10C and described in greater detail below.

Figure 9B:
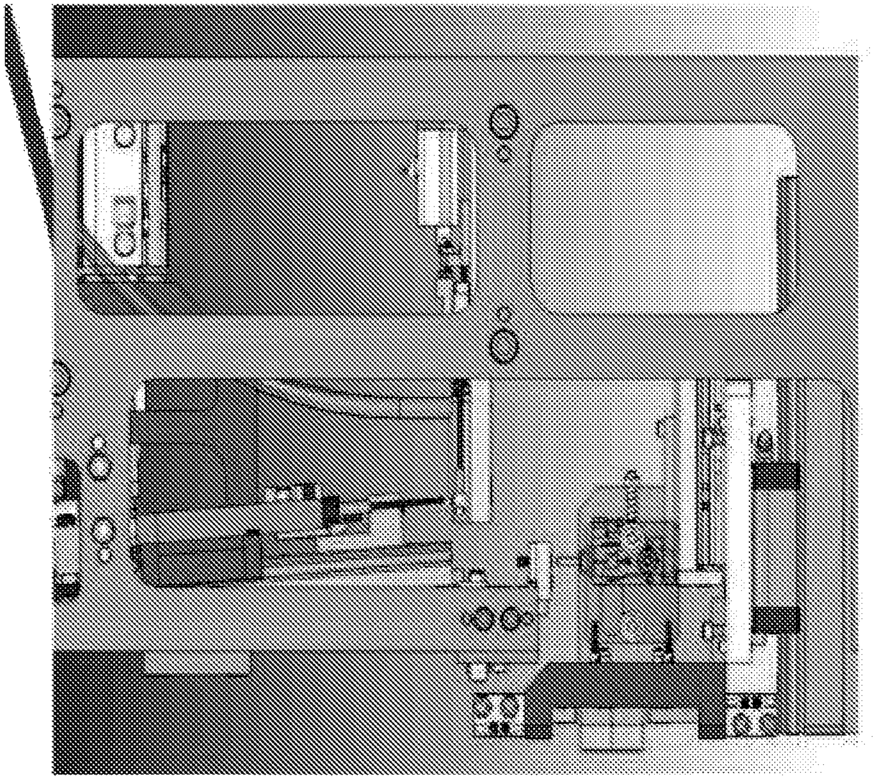
FIGS. 9A-9O illustrate side views of the example seal applicator system during operation according to some implementations of the present disclosure.
Figure 9A:
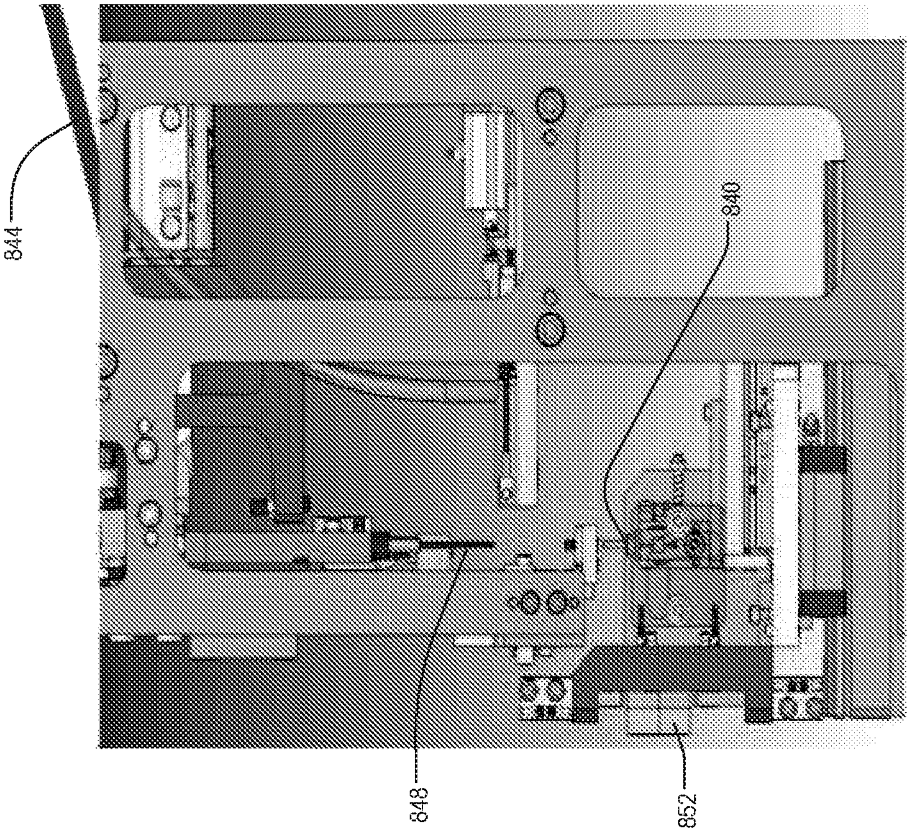
Figure 9D:
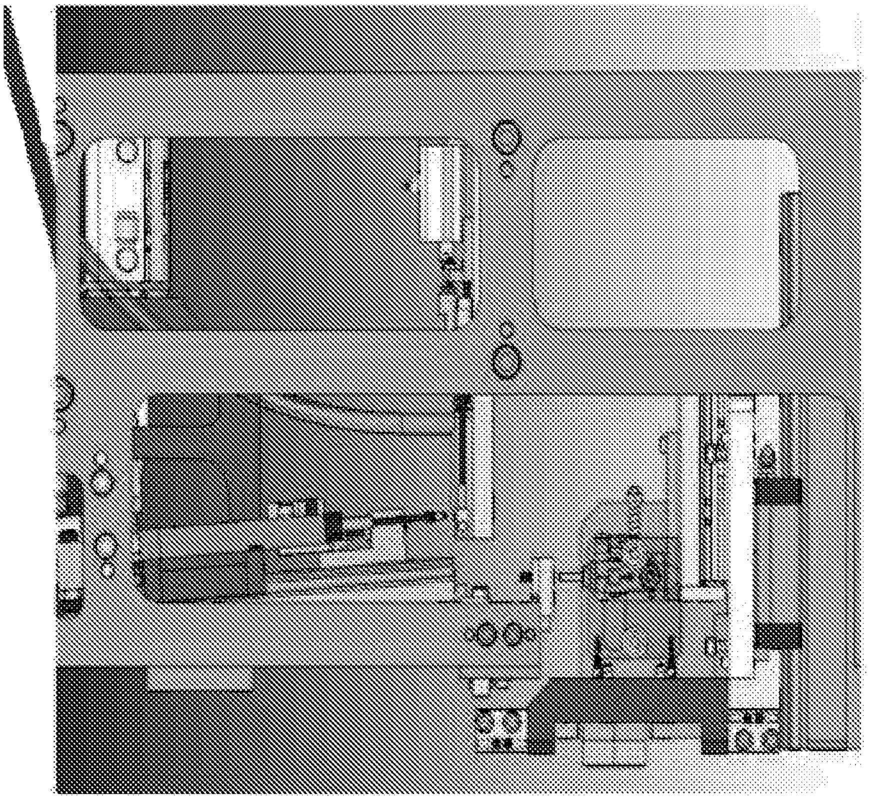
Figure 9C:
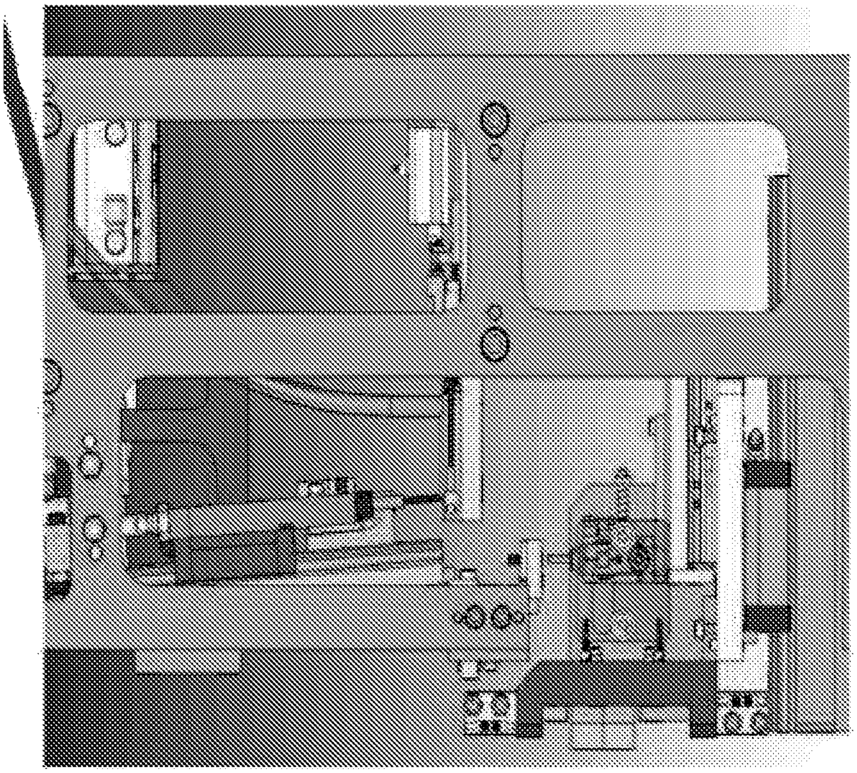
Figure 9F:
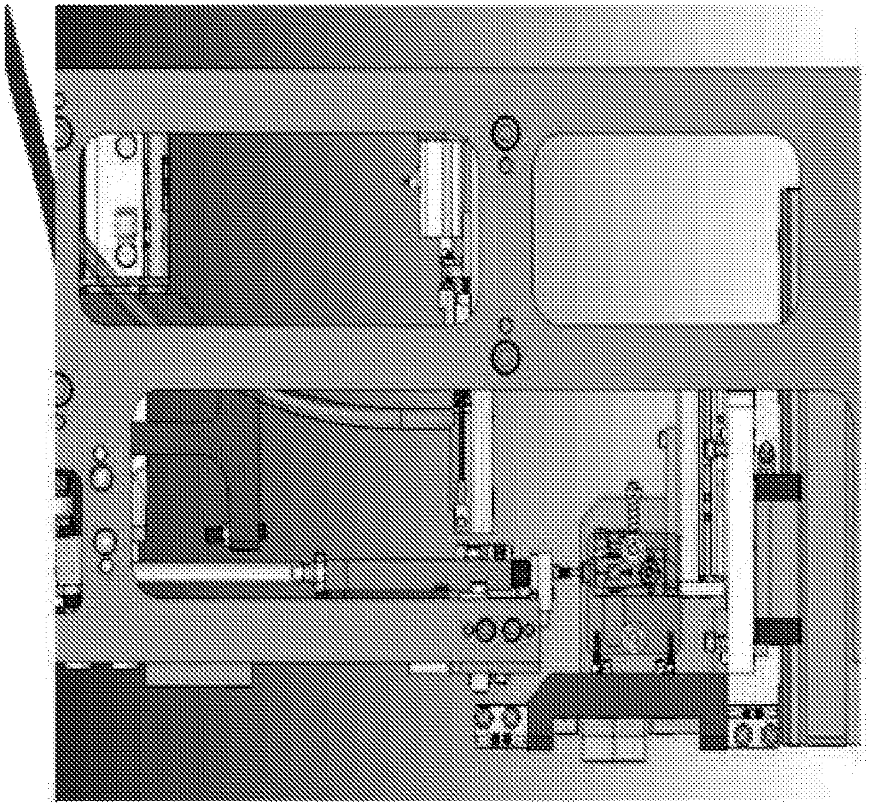
Figure 9E:
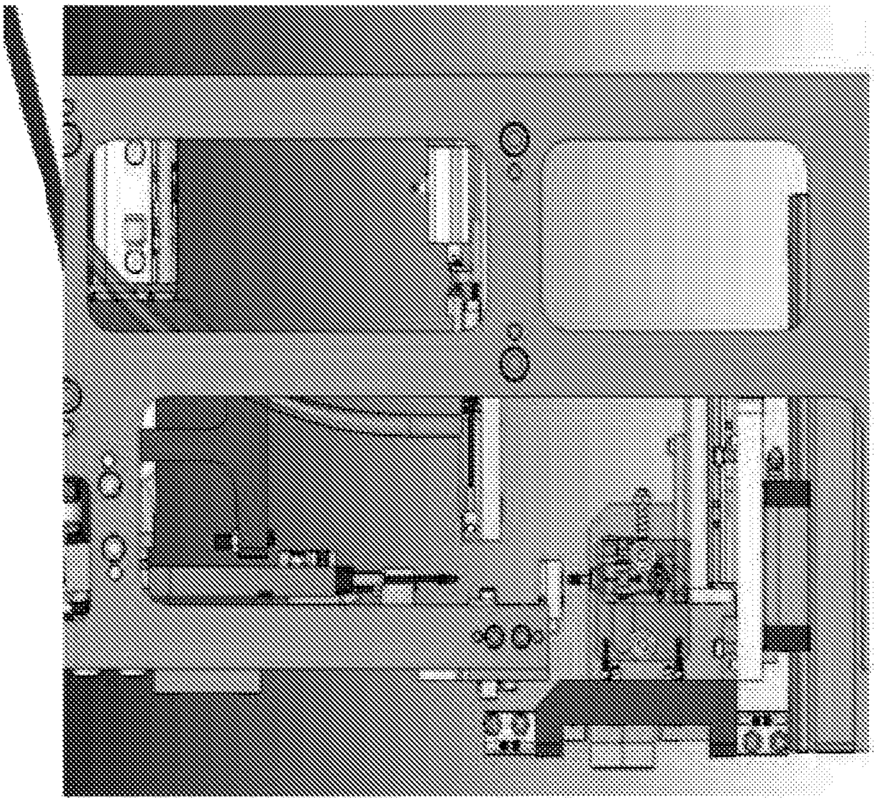
Figure 9H:
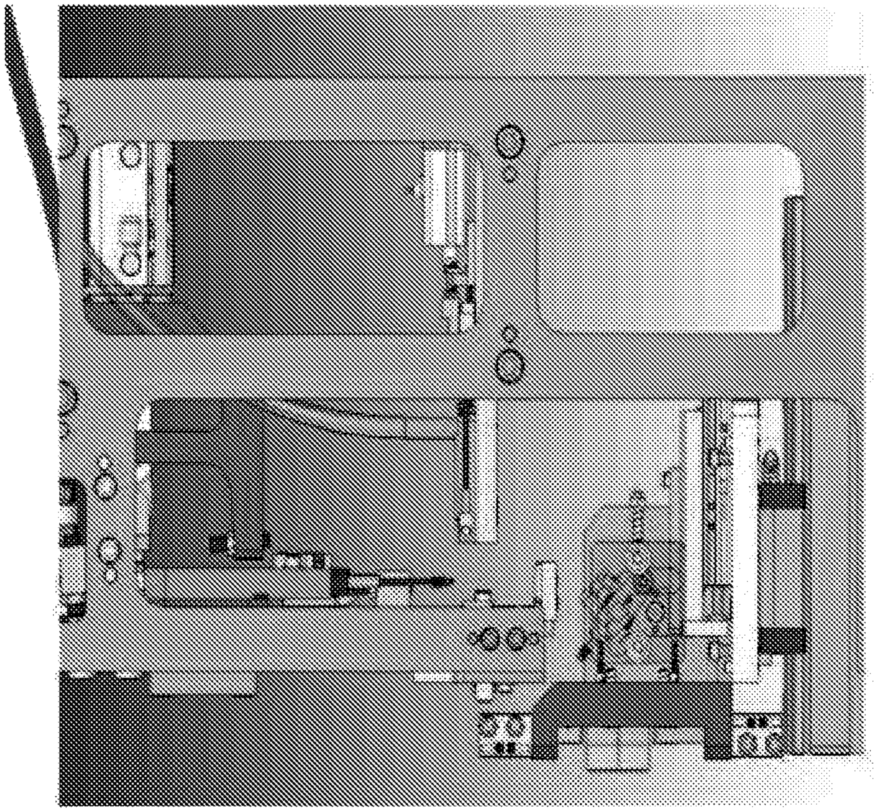
Figure 9G:
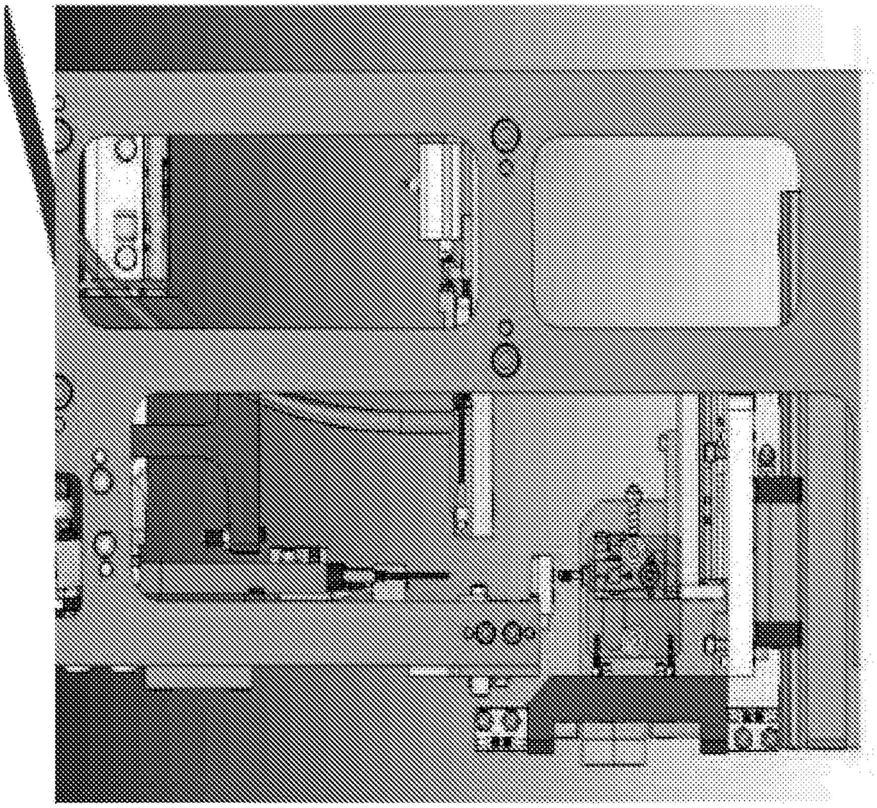
Figure 9J:
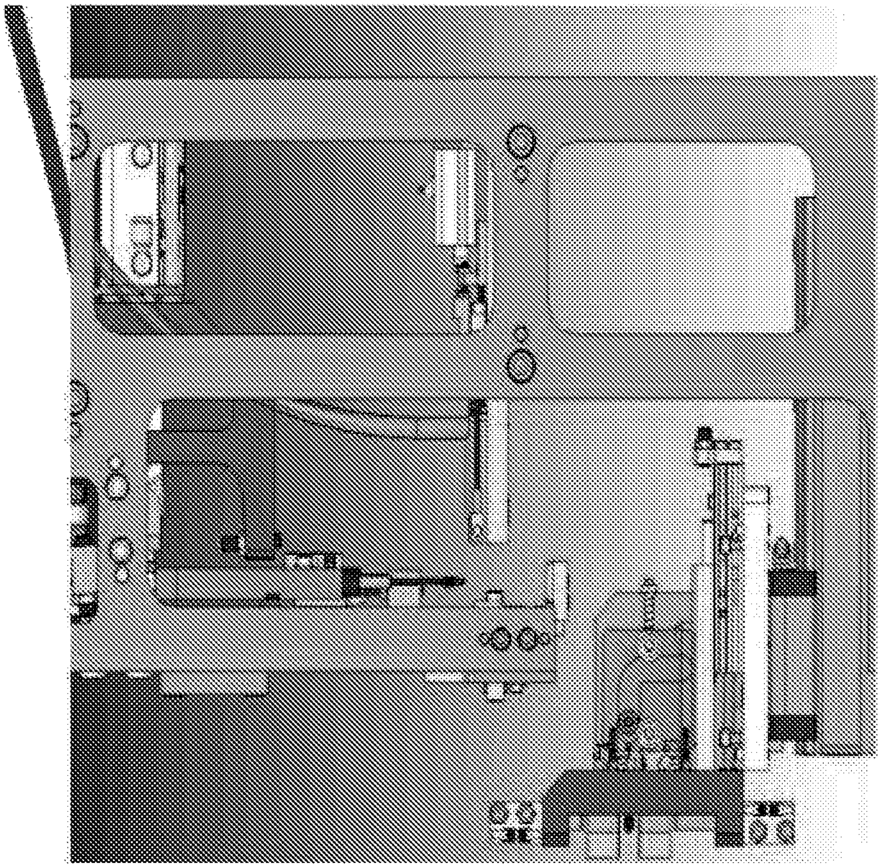
Figure 9I:
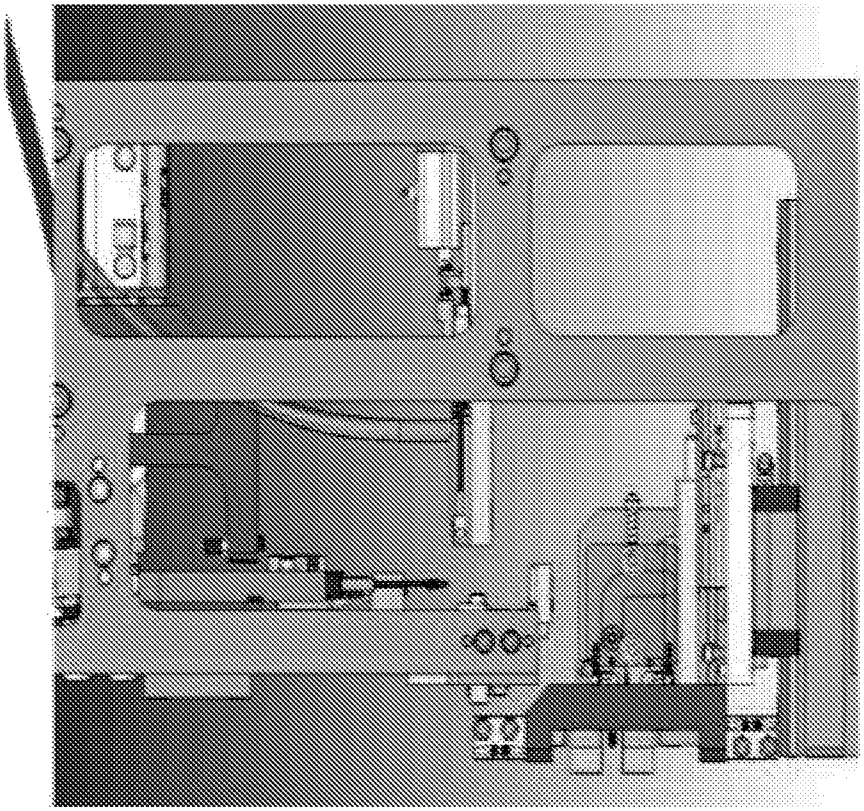
Figure 9K:
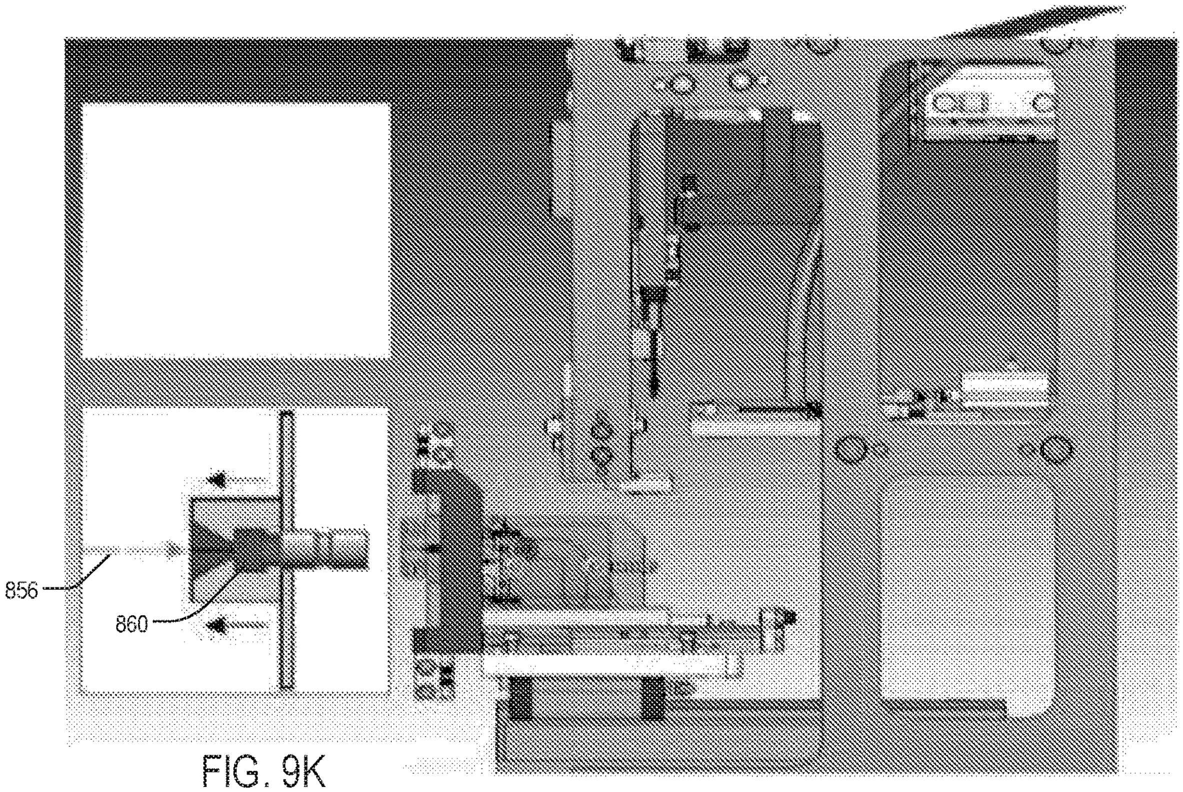
Figure 9L:
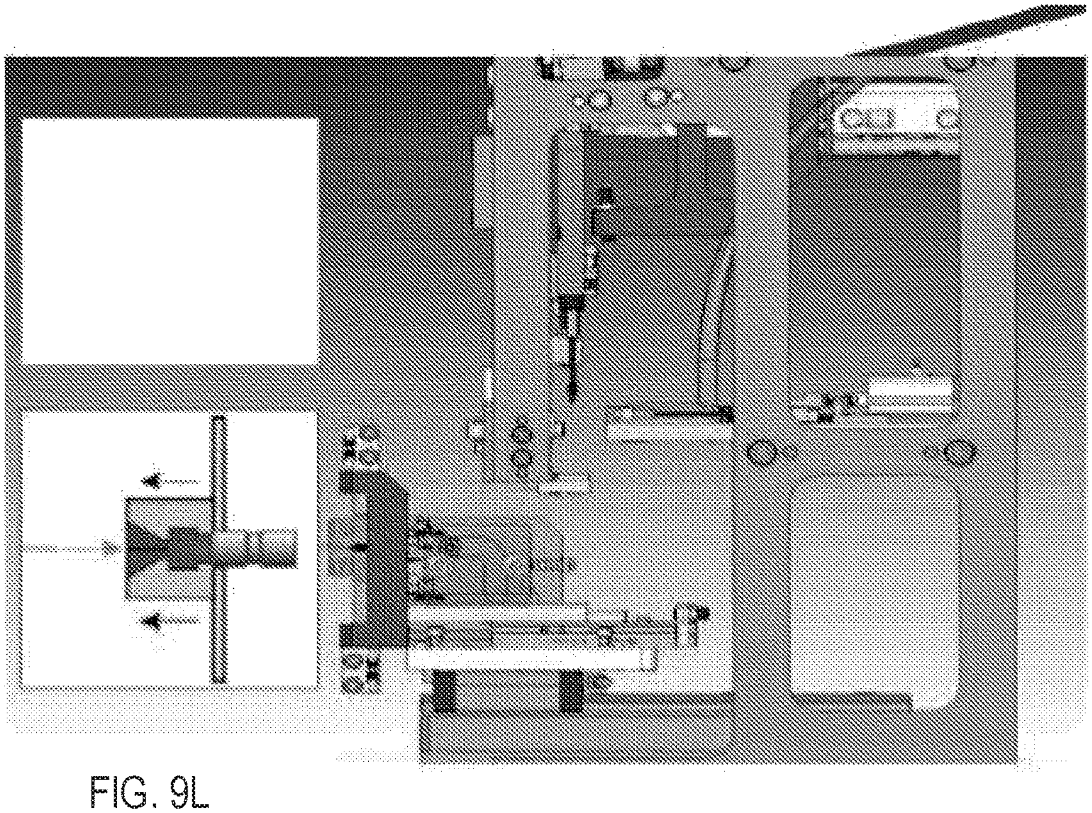
Figure 9M:
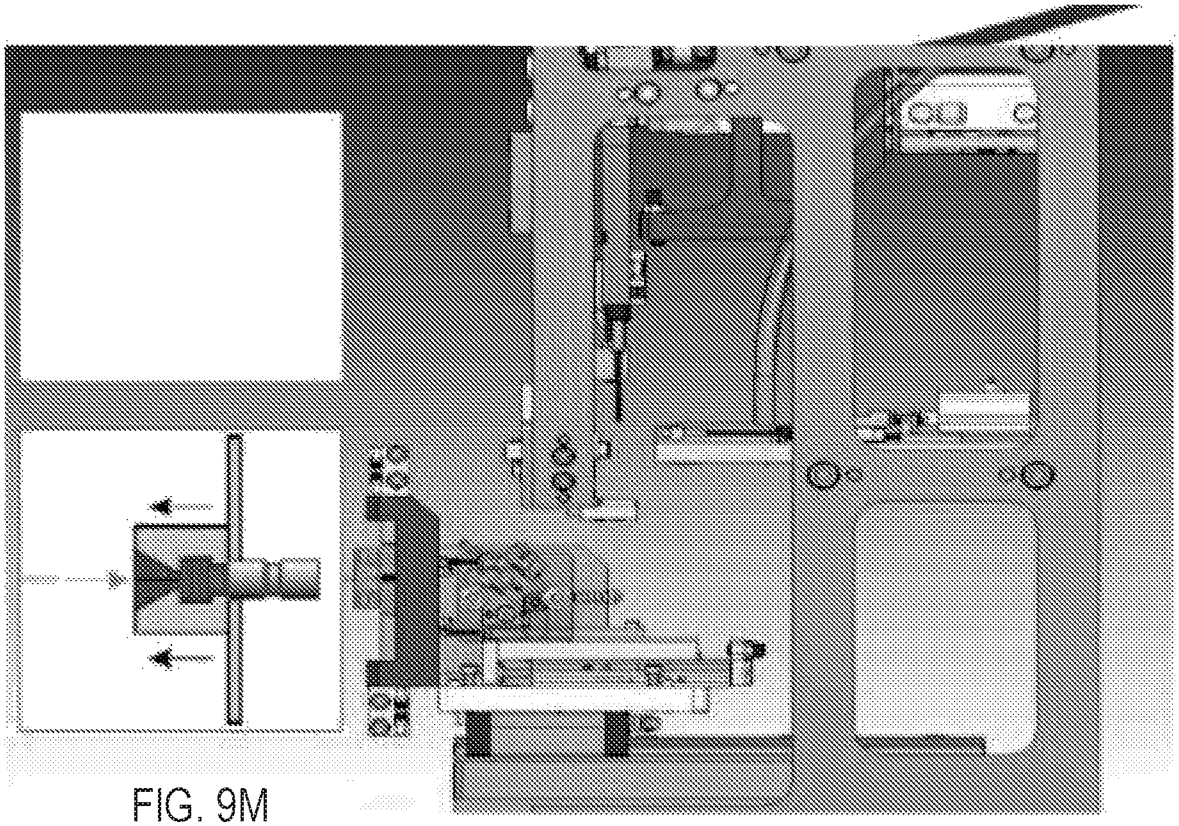
Figure 9N:
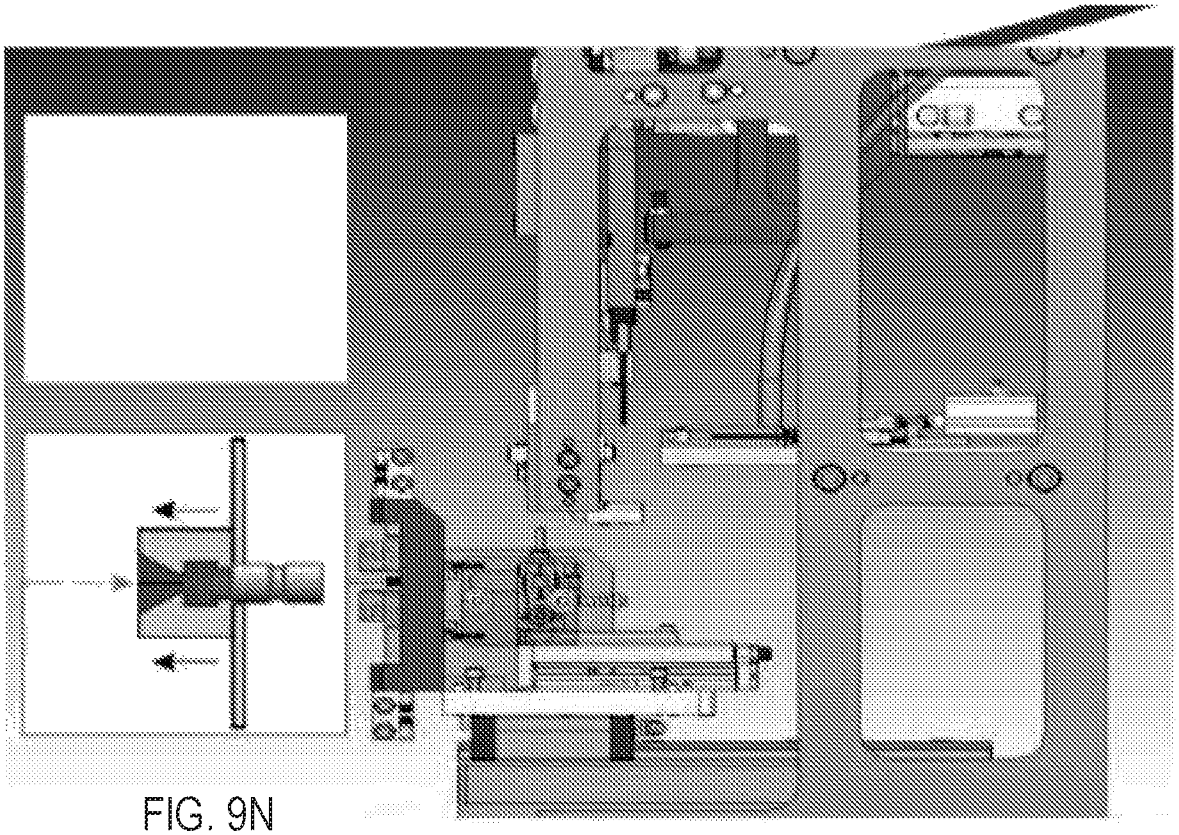
Figure 9O:
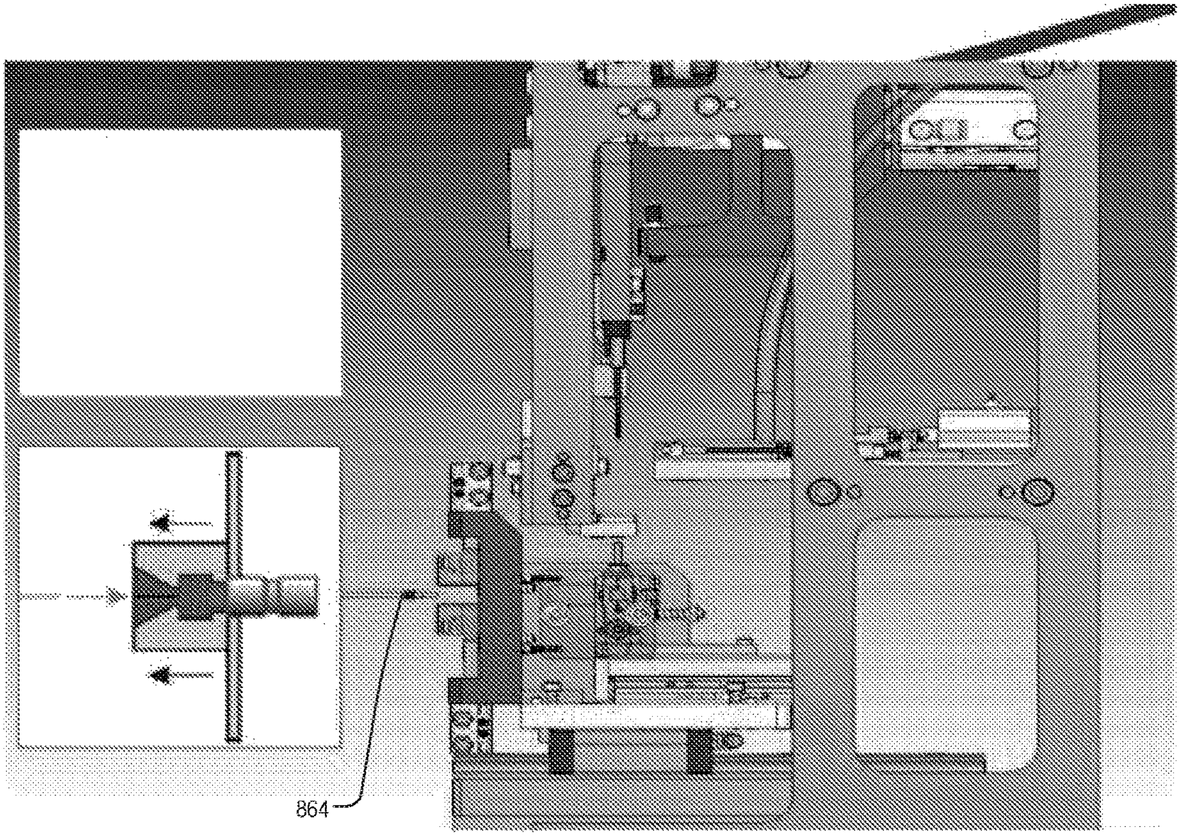

Referring now to FIGS. 9A-9O and with continued reference to FIGS. 8A-8D, side views of the example seal applicator system 800 during operation according to some implementations of the present disclosure are illustrated. In FIG. 9A, a target seal is provided by the seal singulation system 832 via a vacuum fed tube 844. In order to make it clearer to view the component transitions in FIGS. 9B-9O, the reference numerals 844-852 have been left off. In FIG. 9B, a singulation device 848 rotatably translates to the right to a position proximate to the target seal provided via the vacuum fed tube 844. In FIG. 9C, the singulation device 848 moves downwardly and at an angle to obtain movable control of the target seal. In FIG. 9D, the singulation device 848 subsequently retracts with the target seal in its possession. In FIG. 9E, the singulation device 848 returns to its previous base position and in FIG. 9F the singulation device 848 then downwardly feeds the target seal along the second axis 820 to the chuck 840 of the seal applicator assembly 828. In FIG. 9G, the singulation device 848 retracts back to its base position leaving the target seal within the chuck 840. In FIGS. 9H-9I, the chuck 840 rotates to the left to position the target seal in a better orientation for installation. In FIG. 9J, the chuck 840 translates along the third axis 824 to begin installing the target seal. In FIGS. 9K-9O, a zoomed in diagram is also shown to illustrate the application of the target seal 860 onto the target wire 856. In FIG. 9K clamp 852 closes or clamps to hold the target seal firmly in place and in FIGS. 9L-9M the target wire is fed into the target seal while the chuck 840 rotates to the right back towards its original position. In FIG. 9N, the clamp 852 opens or unclamps to release the sealed wire 864 and the chuck 840 finishes rotating to its original position. Lastly, at FIG. 9O, the chuck 840 translates back along the third axis 824 to its base position and the process can continue.

Figure 10A:
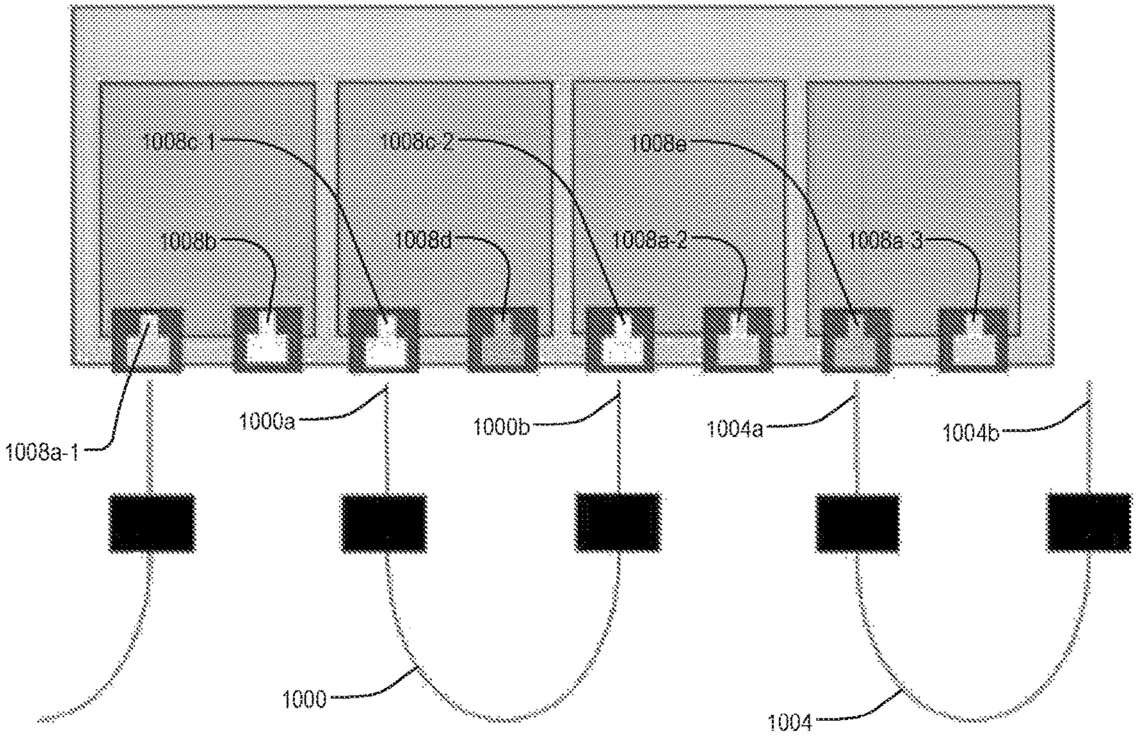
Figure 10B:
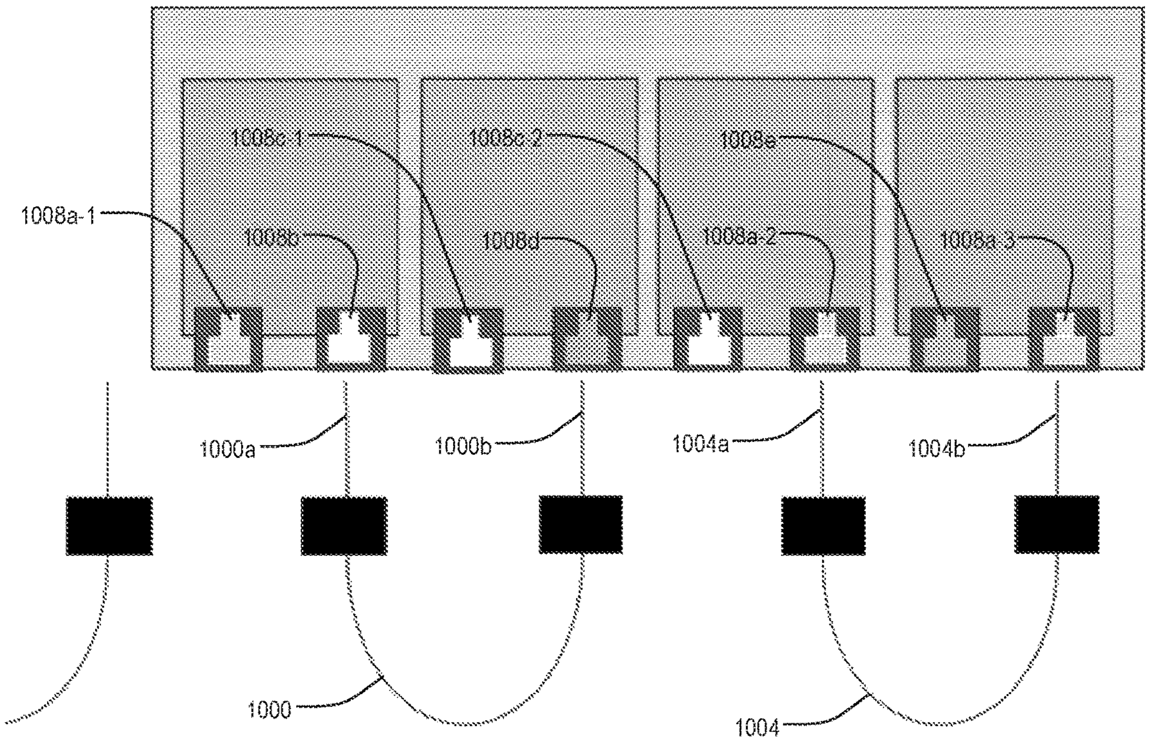

FIGS. 10A-10C illustrate overhead views of the example seal applicator system 800 during seal installation on first and second exposed end portions of a wire according to some implementations of the present disclosure are illustrated. In FIG. 10A, two wires 1000, 1004 having respective exposed end portions 1000*a*, 1000*b* and 1004*a*, 1004*b*. Five different types of seals 1008*a*-1008*e* have also been preloaded or previously singulated by the seal applicator system 800. In FIG. 10B, the seal applicator system 800 translates to the right along the first axis 816 to position seals 1008*b*, 1008*d* proximate to wire end portions 1000*a*, 1000*b* and to position seals 1008*a*-2 and 1008*a*-3 proximate to wire end portions 1004*a*, 1004*b*. In FIG. 10C, a portion of the seal applicator system 800 translates in downward along the third axis 824 to install seals 1008*a*-2 and 1008*a*-3 (the same type of seal 1008*a*) onto wire end portions 1004*a*, 1004*b*. This allows for various different types of seal types to be simultaneously applied to opposing wire end portions, thereby increasing speed and reducing costs.

Figure 11:
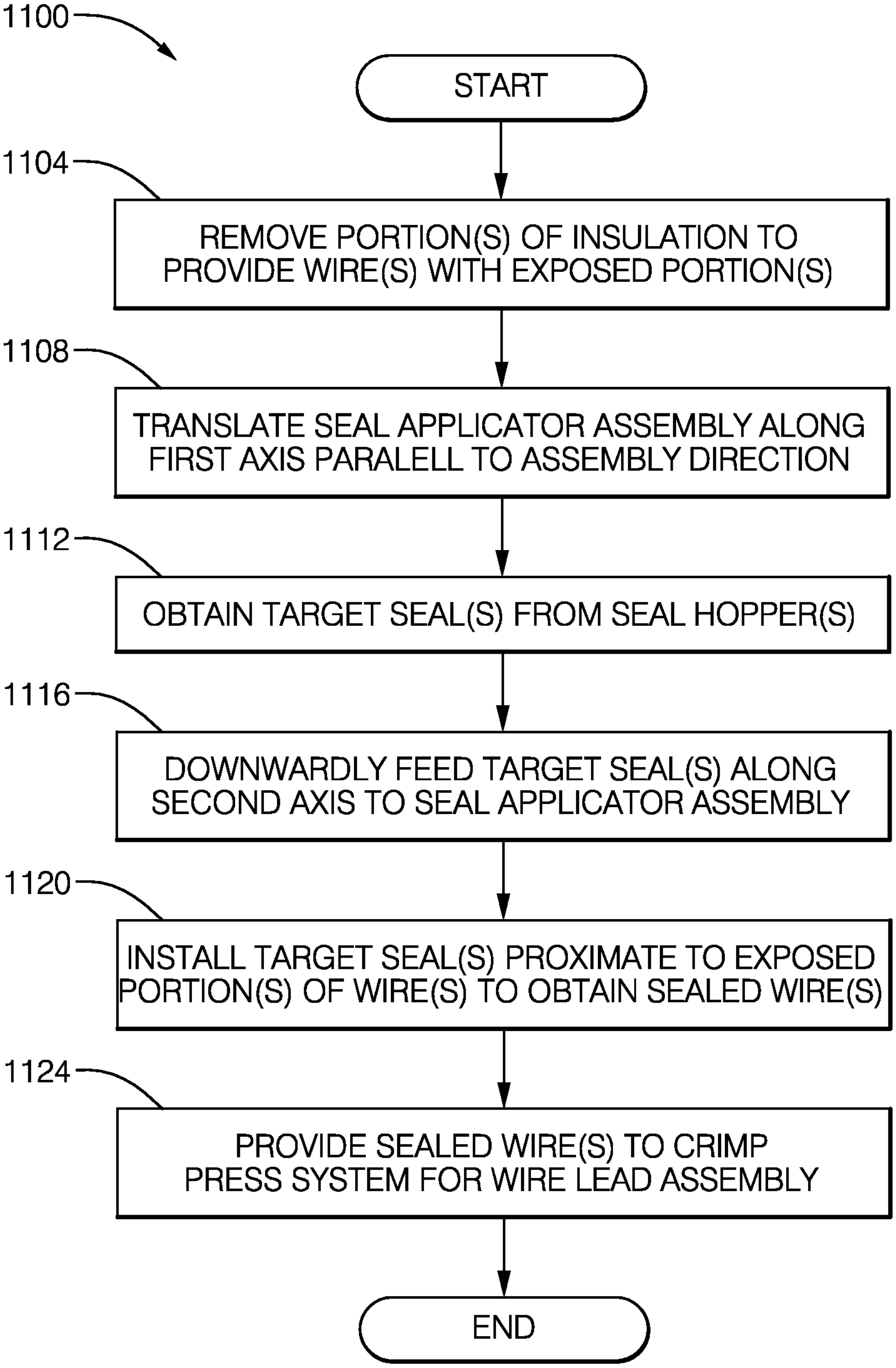
FIG. 11 illustrates a flow diagram of an example method of seal singulation and installation according to some implementations of the present disclosure.

Referring now to FIG. 11, a flow diagram of an example method 1100 of seal singulation and installation according to some implementations of the present disclosure is illustrated. While generally described, it will be appreciated that the method 1100 could be specifically applicable to the components of seal applicator assembly 800 and the other systems/components described herein. At 1104, portion(s) of target wire(s) are removed to provide a target wire with exposed portion(s). At 1108, a seal applicator assembly is translated along a first axis parallel to an assembly direction. At 1112, target seal(s) is/are obtained from one or more seal hoppers (e.g., via a vacuum-fed tube). At 1116, the target seal(s) is/are downwardly fed along a second axis perpendicular to the first axis to a seal applicator assembly. At 1120, the target seal(s) is/are installed proximate to the exposed portion(s) of the target wire(s) to obtain sealed wire(s). At 1124, the sealed wire(s) are provided to a crimp press system for wire lead assembly. The method 1100 then ends or returns to 1104 for one or more additional cycles.

According to one aspect of the present disclosure, an automated wire kitting system for assembling wire leads for a wired connector is presented. In one exemplary implementation, the automated wire kitting system comprises a plurality of terminal containers each storing a different type of terminals for wire leads, a first transport system configured to collect a target terminal from a target terminal container of the plurality of terminal containers, and a second transport system configured to receive the target terminal from the first transport system and to deliver the target terminal to a crimp press, wherein the crimp press is configured to crimp the target terminal onto an exposed portion of a wire to assemble a wire lead.

In some implementation, the first transport system comprises a first gripping device having first opposing gripping members configured to grip and control movement of the target terminal, wherein the first gripping device or a separate sensor system is configured to identify opposing target gripping points on the target terminal and movably close the first opposing gripping members on the opposing target gripping points on the target terminal to control movement of the target terminal from the target terminal container.

In some implementations, the first transport system comprises a first gripping device having first opposing gripping members configured to grip and control movement of the target terminal, and wherein the first gripping device is further configured to translate along a first axis parallel to the plurality of terminal containers to control movement of the target terminal from the target terminal container and translate along a second axis perpendicular to the first axis to deliver and transfer the target terminal to the second transport system.

In some implementations, the second transport system comprises a second gripping device having second opposing gripping members configured to grip and control movement of the target terminal from the first gripping device, wherein the second gripping device is arranged approximately 180 degrees relative to the first gripping device.

In some implementations, the second transport system comprises a second gripping device having second opposing gripping members configured to grip and control movement of the target terminal from the first gripping device, and wherein the second gripping device is further configured to translate along the second axis to control movement of the target terminal from the first gripping device, translate along at least the second axis to deliver the target terminal to the crimp press, control movement of the target terminal from the first gripping device at a first position behind the crimp press, and translate along at least the second axis to a second position in front of the crimp press.

In some implementations, the crimp press comprises a plurality of dies, and wherein the crimp press is further configured to obtain the wire having the exposed portion where the wire's insulation has been removed, receive the target terminal from the terminal delivery system, engage a target die of the plurality of dies corresponding to a type of the target terminal, and crimp the target terminal onto the exposed portion of the wire using the target die of the plurality of dies to assemble the wire lead.

In some implementations, the automated wire kitting system further comprises a wire stripping system configured to remove at least a portion of an insulation of the wire to provide the exposed portion of the wire and a seal applicator system comprising a seal applicator assembly configured to translate along a first axis parallel to an assembly direction of the automated wire kitting system to install a target seal proximate to the exposed portion of the wire to obtain a sealed wire and a seal singulation assembly configured to obtain the target seal from at least one seal hopper each storing a particular type of seals and downwardly feed the target seal along a second axis substantially perpendicular to the first axis to the seal applicator assembly.

According to another aspect of the present disclosure, an automated wire kitting system for assembling wire leads for a wired connector is presented. In one exemplary implementation, the automated wire kitting system comprises a terminal delivery system configured to obtain a target terminal from a plurality of different types of terminals for wire leads and a crimp press comprising a plurality of dies, the crimp press being configured to obtain a wire having an exposed portion where the wire's insulation has been removed, receive the target terminal from the terminal delivery system, engage a target die of the plurality of dies corresponding to a type of the target terminal, and crimp the target terminal onto the exposed portion of the wire using the target die of the plurality of dies to assemble a wire lead.

In some implementations, the plurality of dies are arranged in a shuttle system that is translatable along a first axis to position the target die for engagement. In some implementations, the crimp press comprises eight dies. In some implementations, the shuttle system further comprises securing mechanisms to retain a remainder of the plurality of dies that are not engaged. In some implementations, each of the plurality of dies is also vertically movable along a second axis perpendicular to the first axis in order to engage and disengage the target die. In some implementations, the crimp press further comprises a wedge mechanism configured to be (i) temporarily inserted beneath a bottom portion of the target die when engaged to increase a rigidity of the target die during crimping and (ii) removed from beneath the bottom portion of the target die when disengaging the target die.

In some implementations, the engaged target die receives the target terminal in first and second portions that are initially vertically spaced apart, wherein the automated wire kitting system further comprises a wire delivery system configured to deliver the wire to a front portion of the crimp press such that the exposed portion of the wire is aligned between the first and second portions of the target terminal and in response to delivering the wire, push the wire downward such that the exposed portion of the wire engages or is proximate to the second portion of the target terminal, wherein the crimp press then crimps the target terminal onto the exposed portion of the wire using the engaged target die by pressing the first portion of the target terminal downward onto the exposed portion of the wire and the second portion of the target terminal to obtain the wire lead. In some implementations, the crimp press further comprises a single load sensor configured to be engageable with each of the plurality of dies, wherein the single load sensor, when engaged with the target die, is configured to measure crimping force as part of a crimp force monitoring (CFM) process.

In some implementations, the terminal delivery system comprises first and second transport systems arranged behind the crimp press, the first transport system is configured to (i) control movement of the target terminal from a target terminal container of a plurality of terminal containers storing the plurality of different types of terminals and (ii) deliver the target terminal to the second transport system, and the second transport system is configured to (i) control movement of the target terminal from the first transport system and (ii) deliver the target terminal to a front portion of the crimp press.

In some implementations, the automated wire kitting system further comprises a wire stripping system configured to remove at least a portion of an insulation of the wire to provide the exposed portion of the wire and a seal applicator system comprising a seal applicator assembly configured to translate along a first axis parallel to an assembly direction of the automated wire kitting system to install a target seal proximate to the exposed portion of the wire to obtain a sealed wire and a seal singulation assembly configured to obtain the target seal from at least one seal hopper each storing a particular type of seals and downwardly feed the target seal along a second axis substantially perpendicular to the first axis to the seal applicator assembly.

According to yet another aspect of the present disclosure, an automated wire kitting system for assembling wire leads for a wired connector is presented. In one exemplary implementation, the automated wire kitting system comprises a terminal delivery system comprising a plurality of terminal containers each storing a different type of terminals for wire leads, a first transport system configured to collect a target terminal from a target terminal container of the plurality of terminal containers, and a second transport system configured to receive the target terminal from the first transport system and to deliver the target terminal to a crimp press, the crimp press, wherein the crimp press comprises a plurality of dies and is configured to obtain a wire having an exposed portion where the wire's insulation has been removed, receive the target terminal from the terminal delivery system, engage a target die of the plurality of dies corresponding to a type of the target terminal, and crimp the target terminal onto the exposed portion of the wire using the target die of the plurality of dies to assemble a wire lead, a wire stripping system configured to remove at least a portion of an insulation of the wire to provide the exposed portion of the wire, and a seal applicator system comprising a seal applicator assembly configured to translate along a first axis parallel to an assembly direction of the automated wire kitting system to install a target seal proximate to the exposed portion of the wire to obtain a sealed wire and a seal singulation assembly configured to obtain the target seal from at least one seal hopper each storing a particular type of seals and downwardly feed the target seal along a second axis substantially perpendicular to the first axis to the seal applicator assembly.

In some implementations, the automated wire kitting system of claim further comprises a wire delivery system configured to deliver the wire to a front portion of the crimp press such that the exposed portion of the wire is aligned between the first and second portions of the target terminal and in response to delivering the wire, push the wire downward such that the exposed portion of the wire engages or is proximate to the second portion of the target terminal, wherein the crimp press then crimps the target terminal onto the exposed portion of the wire using the engaged target die by pressing the first portion of the target terminal downward onto the exposed portion of the wire and the second portion of the target terminal to obtain the wire lead.

In some implementations, the seal applicator assembly comprises a chuck configured to receive the target seal and is further configured to translate along a third axis substantially perpendicular to the first and second axes while installing the target seal, the seal singulation system is configured to obtain the target seal from the at least one seal hopper via a vacuum fed tube, the at least one seal hopper comprises a plurality of seal hoppers storing at least two different types of seals, and the seal applicator assembly comprises a plurality of seal applicator devices that are collectively translatable along the first axis and the third axis and wherein the seal singulation assembly comprises a corresponding plurality of seal singulation devices that are each translatable along the second axis.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An automated wire kitting system for assembling wire leads for a wired connector, the automated wire kitting system comprising:
- a plurality of terminal containers each storing a different type of terminals for wire leads;
- a first transport system including a first gripping device having first opposing gripping members; and
- a second transport system including a second gripping device having second opposing gripping members, wherein:
  - the first transport system is configured to collect a target terminal from a target terminal container of the plurality of terminal containers,
  - the first opposing gripping members are configured to grip and control movement of the target terminal,
  - the first gripping device is further configured to:
    - translate along a first axis parallel to the plurality of terminal containers to control movement of the target terminal from the target terminal container, and
    - translate along a second axis perpendicular to the first axis to deliver and transfer the target terminal to the second transport system,
  - the second transport system is configured to receive the target terminal from the first transport system and to deliver the target terminal to a crimp press,
  - the second opposing gripping members are configured to grip and control movement of the target terminal from the first gripping device,
  - the second gripping device is arranged approximately 180 degrees relative to the first gripping device, and the crimp press is configured to crimp the target terminal onto an exposed portion of a wire to assemble a wire lead.

2. The automated wire kitting system of claim 1, wherein the first gripping device or a separate sensor system is configured to identify opposing target gripping points on the target terminal and movably close the first opposing gripping members on the opposing target gripping points on the target terminal to control movement of the target terminal from the target terminal container.

3. The automated wire kitting system of claim 1, wherein the second gripping device is further configured to:

translate along the second axis to control movement of the target terminal from the first gripping device;

translate along at least the second axis to deliver the target terminal to the crimp press;

control movement of the target terminal from the first gripping device at a first position behind the crimp press; and translate along at least the second axis to a second position in front of the crimp press.

4. The automated wire kitting system of claim 1, wherein the crimp press comprises a plurality of dies, and wherein the crimp press is further configured to:

obtain the wire having the exposed portion where an insulation of the wire has been removed;

receive the target terminal from a terminal delivery system;

engage a target die of the plurality of dies corresponding to a type of the target terminal; and crimp the target terminal onto the exposed portion of the wire using the target die of the plurality of dies to assemble the wire lead.

5. An automated wire kitting system for assembling wire leads for a wired connector, the automated wire kitting system comprising:

a plurality of terminal containers each storing a different type of terminals for wire leads;

a first transport system configured to collect a target terminal from a target terminal container of the plurality of terminal containers;

a second transport system configured to receive the target terminal from the first transport system and to deliver the target terminal to a crimp press, wherein the crimp press is configured to crimp the target terminal onto an exposed portion of a wire to assemble a wire lead;

a wire stripping system configured to remove at least a portion of an insulation of the wire to provide the exposed portion of the wire; and a seal applicator system comprising:

a seal applicator assembly configured to translate along a first axis parallel to an assembly direction of the automated wire kitting system to install a target seal proximate to the exposed portion of the wire to obtain a sealed wire; and a seal singulation assembly configured to obtain the target seal from at least one seal hopper each storing a particular type of seals and downwardly feed the target seal along a second axis substantially perpendicular to the first axis to the seal applicator assembly.

6. An automated wire kitting system for assembling wire leads for a wired connector, the automated wire kitting system comprising:

a plurality of terminal containers each storing a different type of terminals for wire leads;

a first transport system configured to collect a target terminal from a target terminal container of the plurality of terminal containers;

a second transport system configured to receive the target terminal from the first transport system and to deliver the target terminal to a crimp press, wherein:

the crimp press includes a plurality of dies, and the crimp press is configured to:

obtain a wire having an exposed portion where an insulation of the wire has been removed, receive the target terminal from a terminal delivery system, engage a target die of the plurality of dies corresponding to a type of the target terminal, and crimp the target terminal onto the exposed portion of the wire using the target die of the plurality of dies to assemble a wire lead; and a wedge mechanism configured to be (i) temporarily inserted beneath a bottom portion of the target die when engaged to increase a rigidity of the target die during crimping and (ii) removed from beneath the bottom portion of the target die when vertically disengaging the target die along an axis.

* * * * *